(12) United States Patent
Harrison

(10) Patent No.: US 7,590,725 B1
(45) Date of Patent: Sep. 15, 2009

(54) NETWORK ANALYZER SYSTEM, METHOD AND COMPUTER PROGRAM PRODUCT FOR MULTI-DIMENSIONAL ANALYSIS OF NETWORK TUNNELS

(75) Inventor: David Ronald Harrison, Fremont, CA (US)

(73) Assignee: McAfee, Inc., Santa Clara, CA (US)

( * ) Notice: Subject to any disclaimer, the term of this patent is extended or adjusted under 35 U.S.C. 154(b) by 944 days.

(21) Appl. No.: 10/612,550

(22) Filed: Jul. 1, 2003

(51) Int. Cl.
*G06F 15/173* (2006.01)
*G06F 11/00* (2006.01)

(52) U.S. Cl. .................. 709/224; 709/223; 714/39
(58) Field of Classification Search ............ 709/223, 709/224; 714/39; 700/14
See application file for complete search history.

(56) References Cited

U.S. PATENT DOCUMENTS

| | | | |
|---|---|---|---|
| 7,062,680 B2* | 6/2006 | Sirbu | 714/39 |
| 7,069,480 B1* | 6/2006 | Lovy et al. | 714/57 |
| 2002/0078384 A1* | 6/2002 | Hippelainen | 713/201 |
| 2002/0086674 A1 | 7/2002 | Jung | 455/436 |
| 2003/0014128 A1* | 1/2003 | Pathak et al. | 700/14 |
| 2003/0070007 A1 | 4/2003 | Tchakmakjian | 709/330 |
| 2004/0199624 A1* | 10/2004 | Poisson et al. | 709/223 |

* cited by examiner

*Primary Examiner*—Philip C Lee
(74) *Attorney, Agent, or Firm*—Zilka-Kotab, PC

(57) ABSTRACT

A system, method and computer program product are provided for capturing and selectively analyzing data frames transmitted between stations in a communications network utilizing tunneling protocols. A connection is established with a communications network. Then, data frames are received in real-time, where the data frames are communicated utilizing tunneling. Such data frames that are communicated utilizing tunneling are subsequently analyzed.

23 Claims, 29 Drawing Sheets

NETWORK ANALYZER SYSTEM, METHOD AND COMPUTER PROGRAM PRODUCT FOR MULTI-DIMENSIONAL ANALYSIS OF NETWORK TUNNELS

FIELD OF THE INVENTION

The present invention relates to network computing, and more particularly to network analysis.

BACKGROUND OF THE INVENTION

Numerous tools have been developed to aid in network management. One example of such tools is a "network analyzer." In general, a network analyzer is a program that monitors and analyzes network traffic, detecting bottlenecks and problems. Using this information, a network manager can keep traffic flowing efficiently, and in a secure manner. A network analyzer may also be used to capture data being transmitted on a network. The term "network analyzer" may further be used to describe a program that analyzes data other than network traffic, or may also be used to classify packets into flows. For example, a database can be analyzed for certain kinds of duplication. Still yet, network analyzers may carry out various security operations (i.e. intrusion detection, etc.). One example of a network analyzer is the SNIFFER® product manufactured by NETWORK ASSOCIATES, INC®.

Network analyzers are often capable of analyzing network traffic across a plurality of protocol layers. Such networking protocols exist at different layers in a stack based on the Open Systems Interconnection (OSI) model for networking.

Network analysis architecture is often loosely based on the OSI model for layering. Protocols are classified by where they occur in the OSI stack. See, for example, Table 1.

TABLE 1

| | |
|---|---|
| Service | (OSI Application) |
| Application | (OSI Application) |
| Session | (OSI Session) |
| Connection | (OSI Transport) |
| Station | (OSI Network) |
| DLC | (OSI Data Link) |
| Global | |
| Subnet | (OSI Network) |

Network analyzers often employ a set of expert protocol interpreters (EPIs), each written to parse protocol header information in real time, or in post-analysis mode, in order to carry out network analysis. EPIs parse header data to perform functions such as those set forth in Table 2.

TABLE 2

| |
|---|
| Identify and graphically depict network objects such as stations, TCP connections, HTTP applications, etc. |
| Count frames and bytes per protocol and object |
| Track state information |
| Diagnose problems based on state information and timing conditions |

Traditionally, network analyzers have successfully analyzed a wide variety of protocols and identified a large number of network objects and associated faults, based on the single dimensional OSI model of networks.

FIG. 1A illustrates an example 10 of network analyzer objects resulting from analysis of a HTTP session, in accordance with the prior art. In this example, the resultant frame 15 is similar to that shown in the present figure.

In the context of the present figure, the following EPIs of Table 3 are called, and analysis progresses up the stack through the frame. Table 3 further indicates the order in which such EPIs are called.

TABLE 3

| | |
|---|---|
| HTTP Service | 5th |
| HTTP App | 4th |
| TCP | 3rd |
| IP | 2nd |
| ETHER | 1st |

An exemplary decode of the foregoing scenario is shown in Table 4.

TABLE 4

| | | |
|---|---|---|
| ETHER DLC | SA = DLC1 | DA = DLC2 |
| IP | SA = IP1 | DA = IP2 |
| TCP | | |
| HTTP | | |

With recent innovations in mobile wireless phone systems, data communications from cell phones or other similar portable devices have become common. It is now possible to attach a laptop computer to a cell phone and surf the Internet, or use a single-unit device to accomplish the same. This may be accomplished using various types of tunneling protocols such as IP tunneling, Generic Routing Encapsulation (GRE) and General Packet Radio Service (GPRS) tunneling protocols.

FIG. 1B illustrates an example of a communication 20 involving tunneling, in accordance with the prior art. As shown, IP3 and IP4 represent IP tunnel endpoints that are carrying an HTTP session in a TCP connection between IP1 and IP2 (dashed line). In this scenario, IP1 is issuing an "HTTP Get" to IP2 through an IP tunnel connected by IP3 and IP4 (solid line). In this example, the resultant frame 25 is similar to that shown in the present figure.

The addition of the second IP header shown in FIG. 1B thus adds a new dimension to the object model. There is thus a need for a network analyzer capable of analyzing traffic inside a tunnel.

DISCLOSURE OF THE INVENTION

A system, method and computer program product are provided for capturing and selectively analyzing data frames transmitted between stations in a communications network utilizing tunneling protocols. A connection is established with a communications network. Then, data frames are received in real-time, where the data frames are communicated utilizing tunneling. Such data frames that are communicated utilizing tunneling are subsequently analyzed.

In one embodiment, the tunneling involves a tunnel. For example, the tunnel may include an Internet Protocol (IP) tunnel, a General Packet Radio Service (GPRS) Tunnel Protocol (GTP) tunnel, and/or a Generic Routing Encapsulation (GRE) tunnel.

In another embodiment, the analyzing may be conditionally performed. For instance, the analyzing may be conditionally performed based on user input. Still yet, the analyzing may be conditionally performed for one or more types of tunnels associated with the tunneling. Such analysis of the one or more types of tunnels may also be carried out based on user input.

During use of one exemplary embodiment, the analyzing may include executing a plurality of protocol interpreters. Optionally, the protocol interpreters may include an Internet Protocol (IP) protocol interpreter. To accommodate any tunneling, the IP protocol interpreter may be re-executed in an iterative manner.

Thus, in operation, each protocol interpreter generates either a single object or plurality of objects. By this functionality, statistics and diagnosed failure conditions associated with the objects may be displayed via a user interface for analysis purposes.

DESCRIPTION OF THE PREFERRED EMBODIMENTS

Figure 1A:
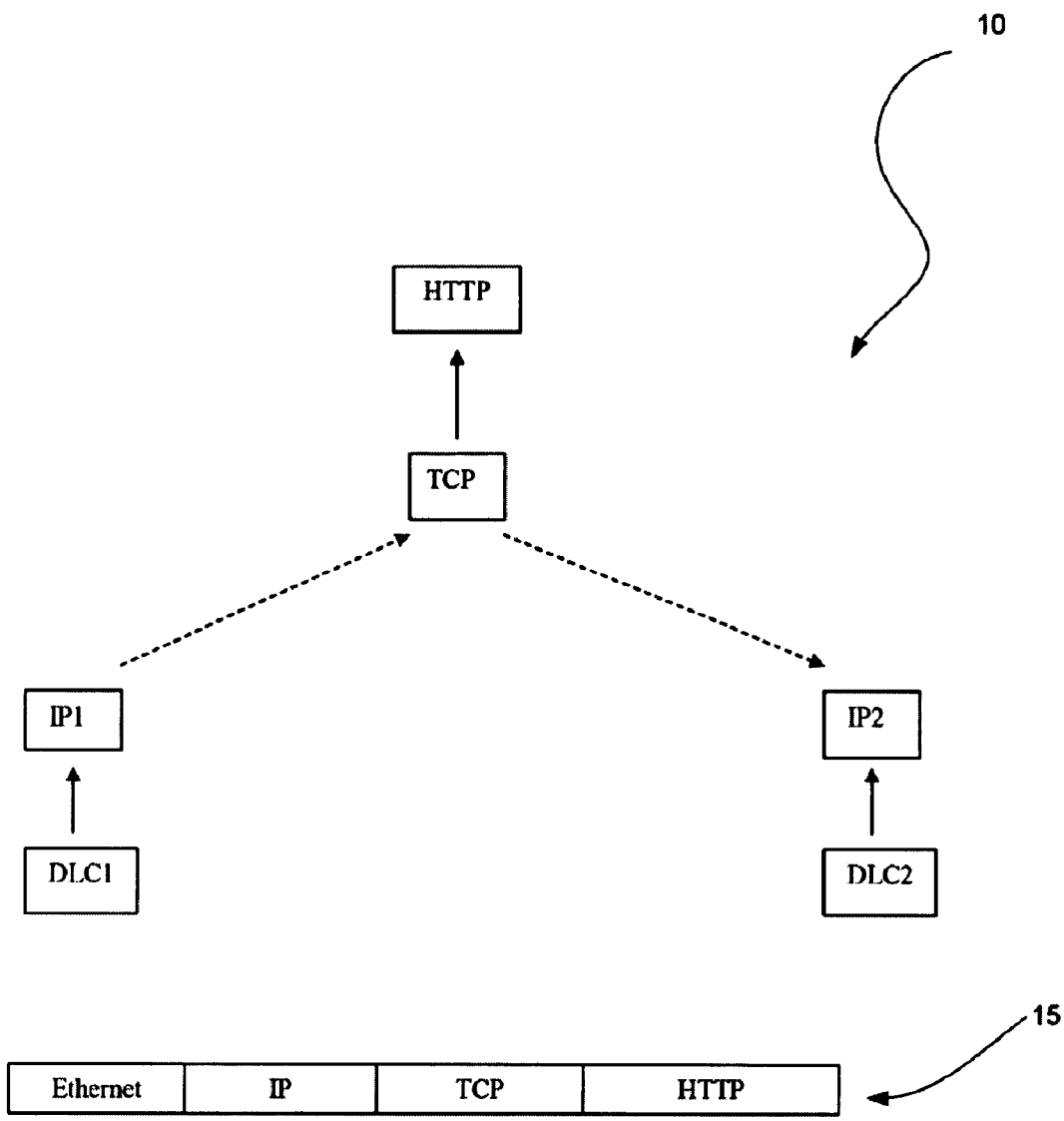
FIG. 1A illustrates an example of network analyzer objects resulting from analysis of a non-tunneled HTTP session, in accordance with the prior art.
Figure 1B:
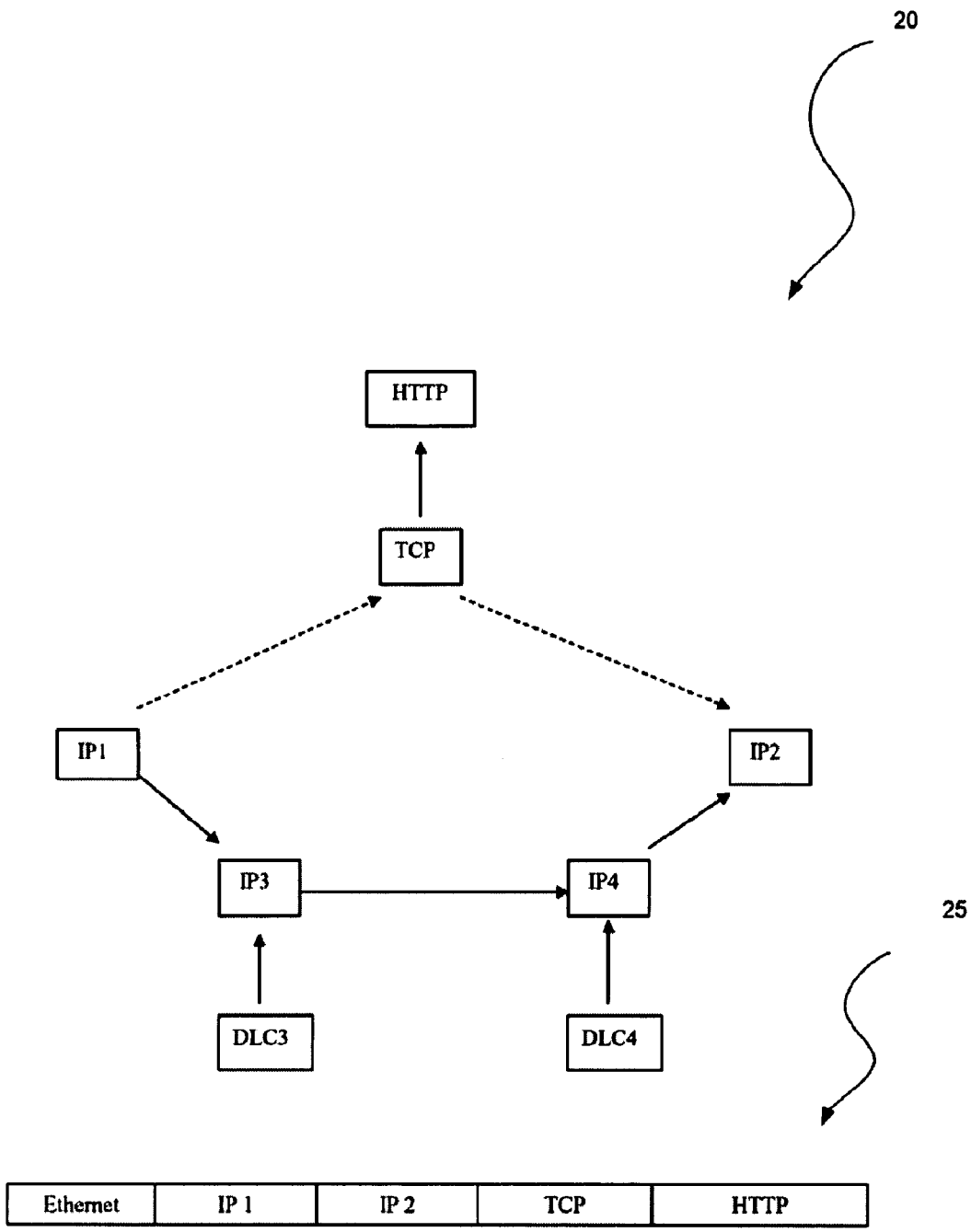
FIG. 1B illustrates an example of a communication involving tunneling, in accordance with the prior art.
Figure 1C:
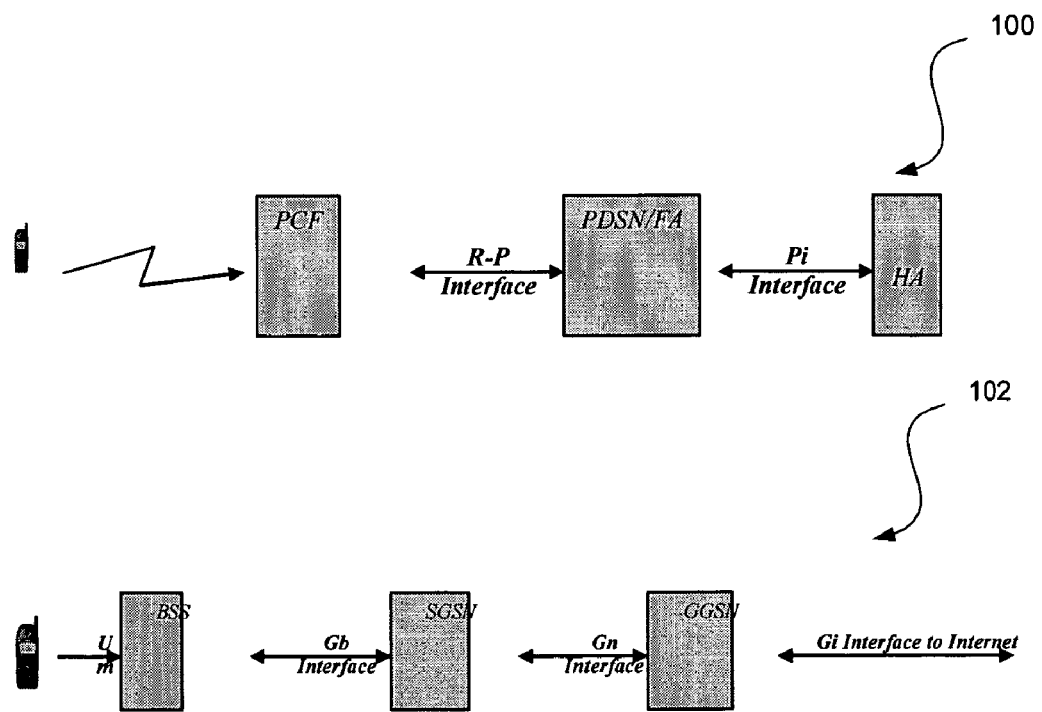
FIG. 1C illustrates exemplary network architectures, in accordance with one embodiment.

FIG. 1C illustrates exemplary network architectures 100 and 102, in accordance with one embodiment. Mobile phones and/or other similar mobile devices may be connected to various system components, as shown.

Figure 2:
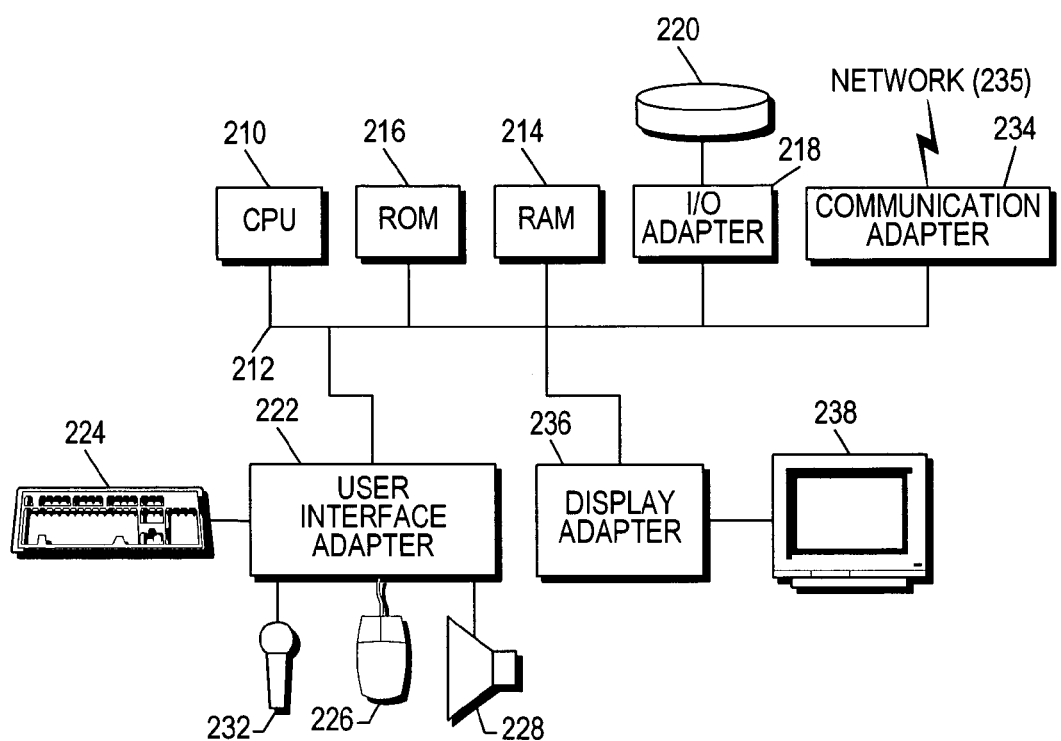
FIG. 2 shows a representative hardware environment that may be associated with the various system components of FIG. 1C, in accordance with one embodiment.

FIG. 2 shows a representative hardware environment that may be associated with the various system components of FIG. 1C, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, network interface adapter 234 for connecting the workstation to a communication network 235 (e.g., a data processing network such as that of FIG. 1C, for example) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, Linux or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing any network configuration, and the foregoing platform should not be construed as limiting in any manner.

Figure 3:
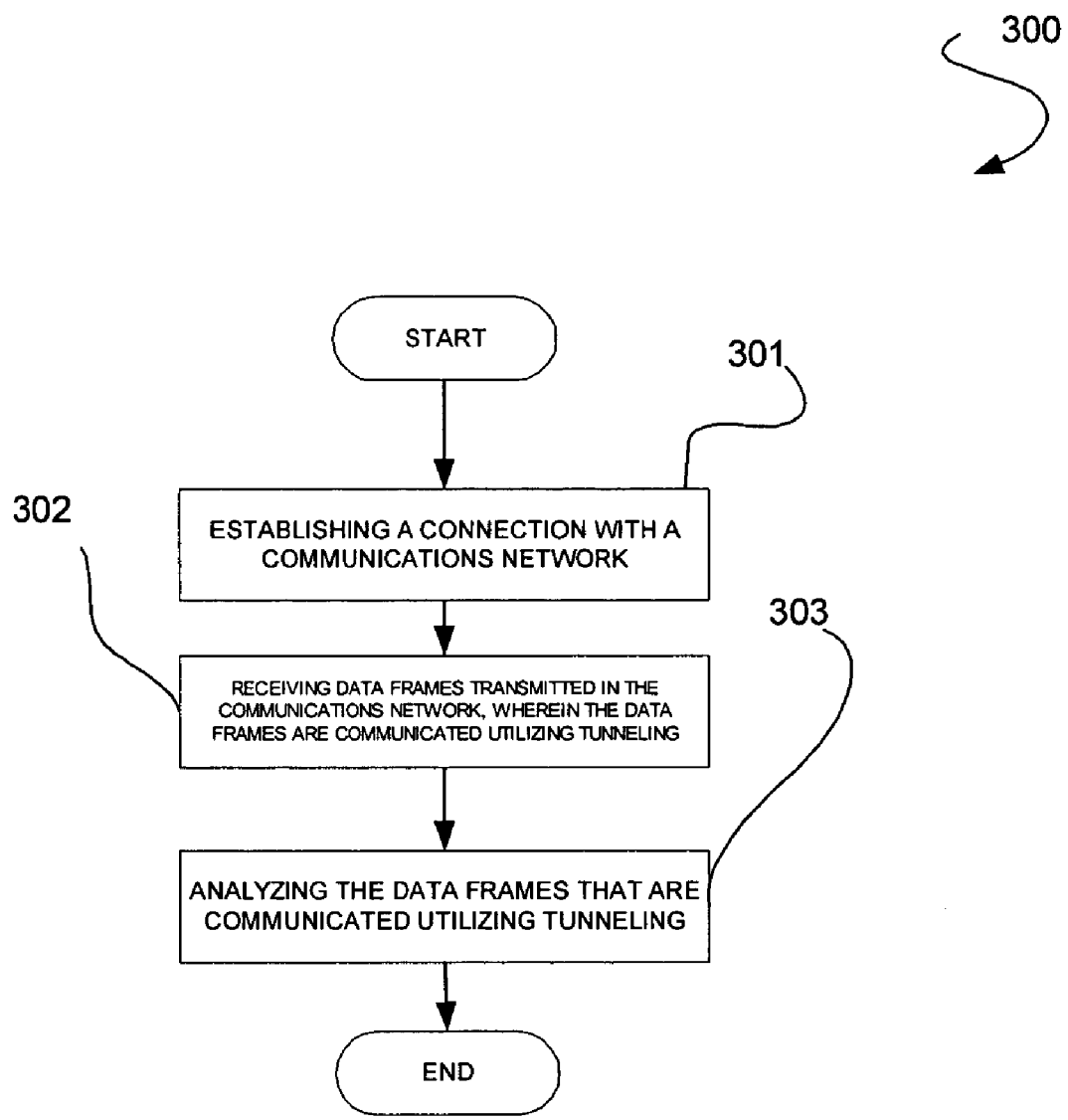
FIG. 3 illustrates one exemplary method for capturing and selectively analyzing data frames transmitted between stations in a wireless communications network utilizing tunneling protocols, in accordance with one embodiment.

FIG. 3 illustrates one exemplary method 300 for capturing and selectively analyzing data frames transmitted between stations in a wireless communications network utilizing tunneling protocols, in accordance with one embodiment. As an option, the present method 300 may be implemented in the context of the system components of FIGS. 1C and 2. Of course, the present method 300 may be implemented in any desired context.

As shown, a connection is initially established with a wireless communications network. Note operation 301. In the context of the present description, the connection may be any hard-line and/or wireless connection with the wireless communications network.

In operation 302, data frames are received in real-time, or in post analysis mode from a loaded trace file, where the data frames are communicated utilizing tunneling. In the present context, the data frames may include any frame, packet or component of communications being carried out over the wireless communications network. Moreover, tunneling may, in one embodiment, include any transmission of data intended for use within a private network through a public network in such a way that the routing nodes in the public network are unaware that the transmission is part of a private network. For example, tunneling may be accomplished by encapsulating the private network data and protocol information within the public network transmission units so that the private network protocol information appears to the public network as data. Of course, "tunneling," in the context of the present description, may refer to any type of network tunneling.

In one embodiment, the tunneling involves a tunnel. For example, the tunnel may include an Internet Protocol (IP) tunnel, a General Packet Radio Service (GPRS) Tunnel Protocol (GTP, i.e., GTP 98, 99, GTP Versions 0 and 1, etc.) tunnel, and/or a Generic Routing Encapsulation (GRE) tunnel.

Thus, in use, such data frames that are communicated utilizing tunneling are subsequently analyzed. See operation 303. Optionally, the analyzing may be conditionally performed. For instance, the analyzing may be conditionally performed based on user input. Still yet, the analyzing may be conditionally performed for one or more types of tunnels associated with the tunneling. Such analysis of the one or more types of tunnels may also be carried out based on user input.

During use of one exemplary embodiment, the analyzing may include executing a plurality of protocol interpreters (EPIs). Optionally, the EPIs may include an Internet Protocol (IP) protocol interpreter. To accommodate any tunneling, the IP protocol interpreter may be re-executed in a recursive manner.

Thus, in operation 303, the EPIs generate at least one object. By this functionality, statistics associated with the objects may be displayed via a user interface for analysis purposes.

As an option, in one embodiment, a separate object need not necessarily be created for the tunnel. Instead, IP objects may be linked in such a way as to logically portray the relationship between the tunnel endpoints and the stations conversing inside the tunnel. By this design, problems such as latency and throughput can be discovered inside a tunnel. Each object may be linked logically and depicted as such graphically in an intuitive graphical user interface (UI), as will soon become apparent. Adverse conditions for each object may be diagnosed and presented in a detailed screen associated with such object.

Table 5 illustrates an exemplary sequence in which various EPIs may be called so that analysis progresses up a stack, through the frame.

TABLE 5

| HTTP Service | 6th |
| HTTP App | 5th |
| TCP | 4th |
| IP ($2^{nd}$ pass) | 3rd |
| IP (1st pass) | 2nd |
| ETHER | 1st |

An exemplary decode of this scenario is set forth in Table 6.

TABLE 6

| ETHER DLC | SA = DLC 3 | DA = DLC4 |
| IP | SA = IP3 | DA = IP4 |
|  | (tunnel endpoint) | (tunnel endpoint) |
| IP | SA = IP1 | DA = 1P2 |
| TCP |  |  |
| HTTP |  |  |

To accomplish the aforementioned recursion, an additional "dummy" IP EPI may be created called IPIP. When parsing through the frame, the first outer IP header may be parsed by the IP EPI. One function of an EPI is to determine the next protocol and set a variable so that the EPI of the next protocol may be called next in a loop. Given this functionality, the IP EPI may be enhanced so that, if it encounters IP data, in the next header field, it calls the IPIP EPI. The IPIP EPI then counts frames and bytes and sets the next protocol to IP. This, in turn, links the tunnel endpoint station to the "inside" station. A similar technique may be used for GRE and GTP tunnels. However, with respect to GTP, special API calls may be made to manually link objects. UI options may exist to enable/disable this feature. A more detailed synopsis for the protocols supported by one embodiment will now be set forth.

Figure 4:
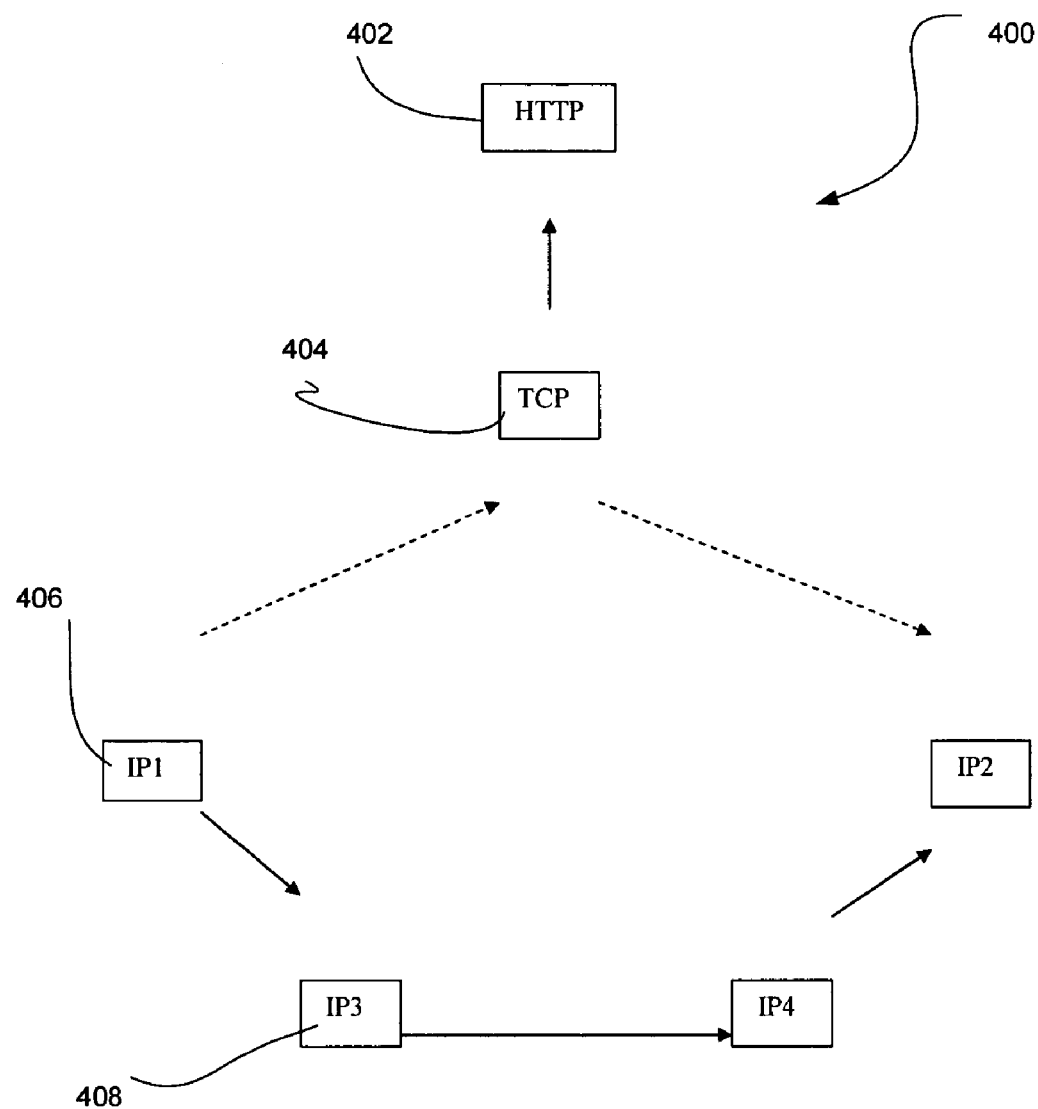
FIG. 4 illustrates a model as to how IP tunneling may work in the context of a network analyzer, in accordance with one embodiment.

FIG. 4 illustrates a model 400 as to how IP tunneling may work in the context of a network analyzer, in accordance with one embodiment. As an option, the present model 400 may be implemented in the context of the system components and method of the previous figures. Of course, the present model 400 may be implemented in any desired context.

In the present model, IP3 and IP4 endpoints 408 represent IP tunnel endpoints that are carrying an HTTP session 402 in a TCP conversation 404 between stations IP1 and IP2 406 inside the tunnel (dashed line). In this scenario, IP1 is issuing an HTTP Get instruction to IP2 over an IP tunnel connected by IP3 and IP4 (solid line). This conversation 404 is represented, by way of example, in the frame shown in Table 7.

TABLE 7

| ETHER DLC | | |
|---|---|---|
| IP | SA = IP3 | DA = IP4 |
| | (tunnel endpoint) | (tunnel endpoint) |
| IP | SA = IP1 | DA = IP2 |
| TCP | | |
| HTTP | | |

Figure 4A:
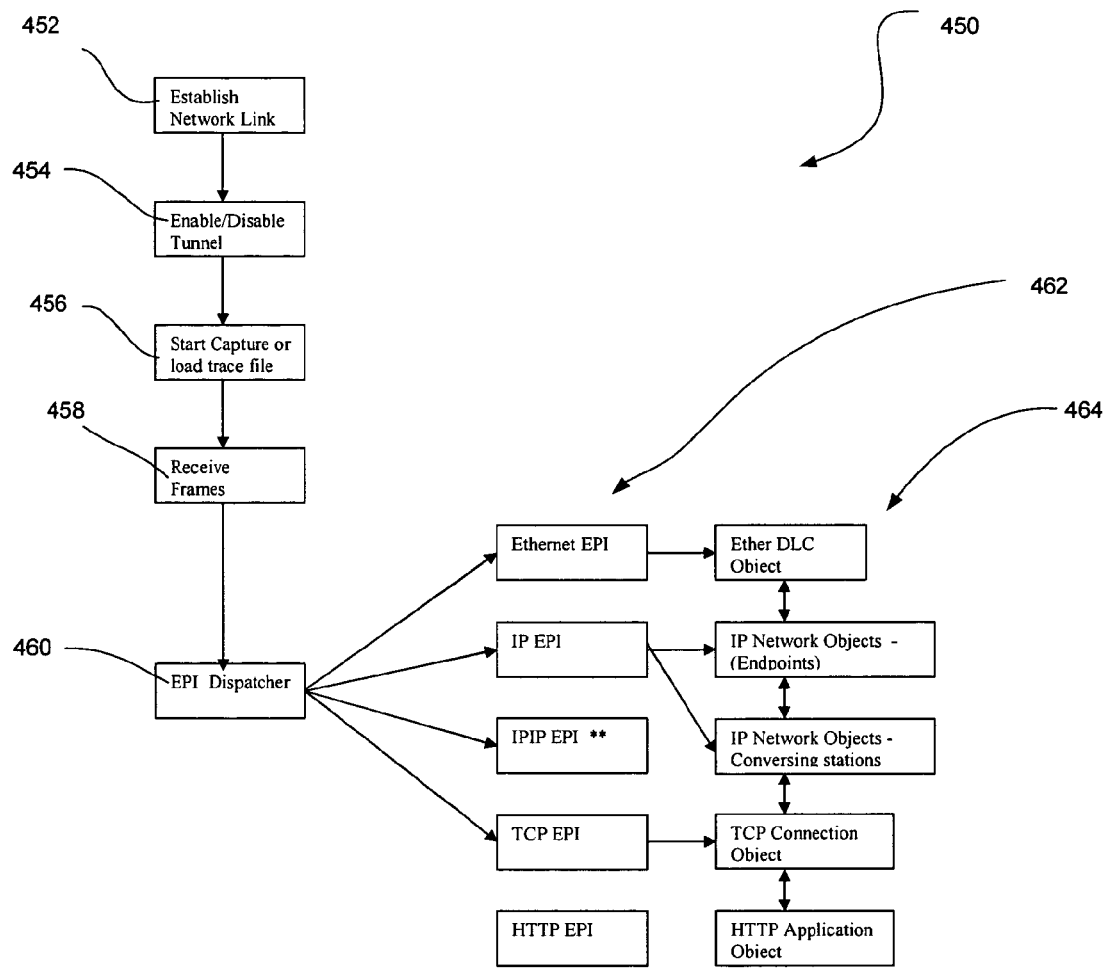
FIG. 4A illustrates one exemplary method for capturing and selectively analyzing data frames transmitted between stations in a wireless communications network, in the context of an IP tunneled HTTP frame.

FIG. 4A illustrates one exemplary method 450 for capturing and selectively analyzing data frames transmitted between stations in a wireless communications network, in the context of an IP tunneled HTTP frame. As an option, the present method 450 may be implemented in the context of the system and method components of previous figures. Of course, the present method 450 may be implemented in any desired context.

As shown, a network link is first established in operation 452, after which it is determined whether tunnel analysis is enabled in operation 454. A capture session is then initiated or a trace file is loaded in operation 456, in order to prompt the receipt of data frames. See operation 458.

An EPI dispatcher 460 then executes various EPIs 462 (i.e. Ethernet, IP, IPIP, TCP, HTTP, etc.), which, in turn, create and link various objects 464 in the manner set forth during reference to FIG. 4. Note, again, that the IP EPI is re-executed, as set forth hereinabove when tunneling analysis is enabled. Such objects 464 may then be processed and displayed in various ways. More exemplary information regarding such displaying will now be set forth in greater detail.

Figure 5:
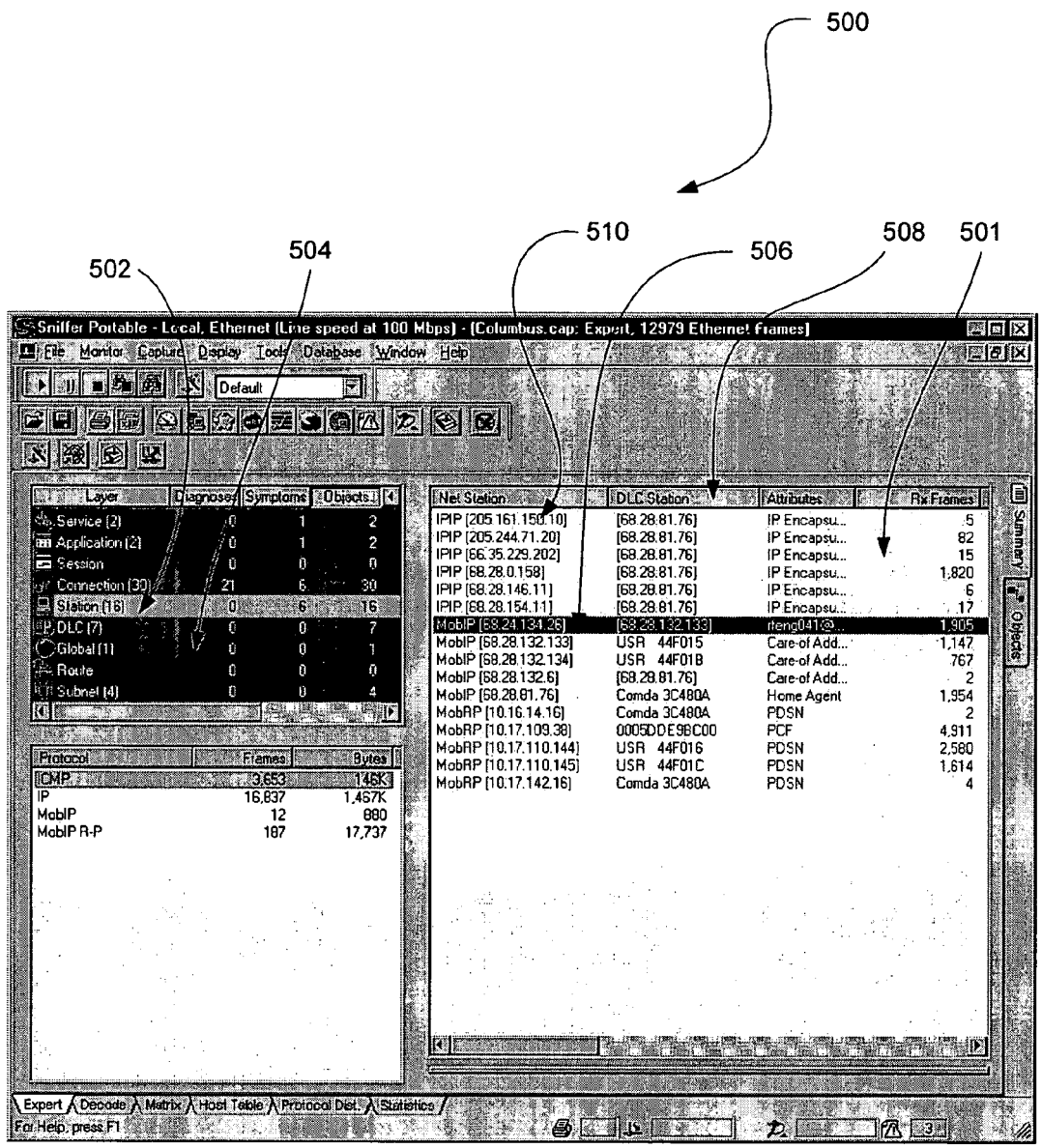
FIG. 5 illustrates a graphical user interface showing a station layer summary screen of a network analyzer, in accordance with one embodiment.

FIG. 5 illustrates a graphical user interface 500 showing a station layer summary screen 501 of a network analyzer, in accordance with one embodiment. As an option, the present graphical user interface 500 may be implemented in the context of the system components and methods of the previous figures. Of course, the present graphical user interface 500 may be implemented in any desired context.

Such station layer summary screen 501 may be displayed in response to the user selection of a station icon 502 in a separate window 504. As shown in the station layer summary screen 501 of the present graphical user interface 500, address "68.24.134.26" 506 is a mobile station identified as "freng041@xxx.com." The illustrated highlighting may be effected by user selection of such address 506.

In the case of IP tunneling, a "Data Link Control" (DLC) Station" column 508 contains the IP tunnel endpoint IP address rather than DLC station info. This may also be the case in more detailed screens. Performing an Expert object filter operation on an IP tunneled station, represented as "IPIP" in a net station column 510, as shown, may be used to filter out tunneled frames for that station. In one embodiment, byte counts distinguish between stations inside the tunnel and endpoints.

Figure 6:
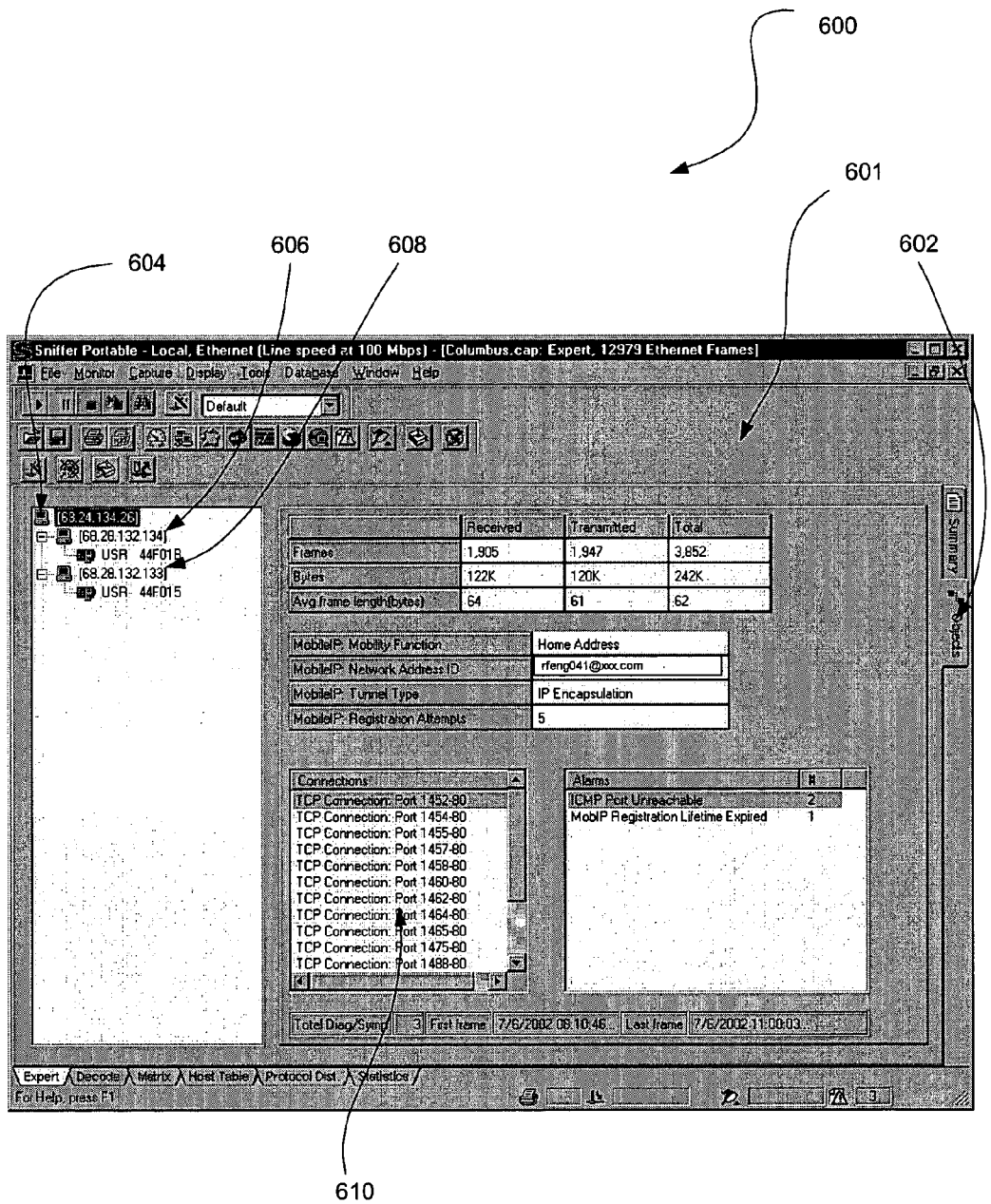
FIG. 6 illustrates a graphical user interface showing a station object details screen of a network analyzer associated with the selected object of FIG. 5, in accordance with one embodiment.

FIG. 6 illustrates a graphical user interface 600 showing a Mobile Home Address station object's detail screen 601 of a network analyzer associated with the selected object highlighted in FIG. 5, in accordance with one embodiment. As an option, the present graphical user interface 600 may be implemented in the context of the system components, methods, and graphical user interfaces of the previous figures. Of course, the present graphical user interface 600 may be implemented in any desired context.

In use, the object details screen 601 may be prompted by selection of tabs 602 associated with the object details screen 601. Of course, one may return to the screen of FIG. 5 by using such tabs 602. As shown, the object details screen 601 contains detailed information for the mobile station identified in FIG. 5. The object links represent the relationship between 68.24.134.26 (Home Address) 604, and the 68.28.132.134 address 606 and 68.28.132.133 address 608, both "care-of addresses," or tunnel endpoints. They are linked to show their relationship in the mobile registration. The connections list box 610 contains many TCP connections using port 80 (HTTP). Moreover, such connections may be selected via a mouse or the like.

Figure 7:
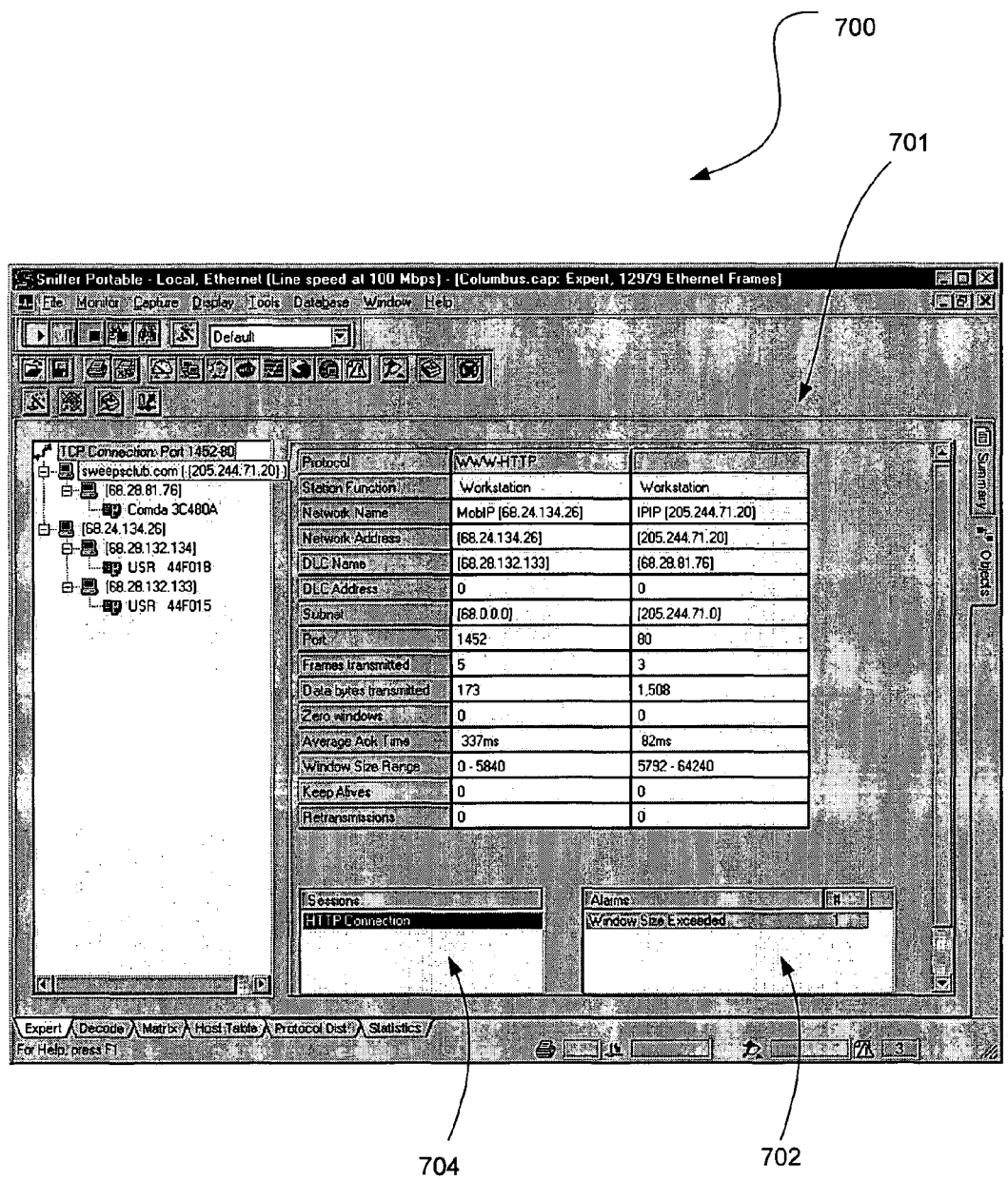
FIG. 7 illustrates a graphical user interface showing a TCP connection details screen of a network analyzer associated with the selected connection of FIG. 6, in accordance with one embodiment.

FIG. 7 illustrates a graphical user interface 700 showing a TCP connection details screen 701 of a network analyzer associated with the selected connection of FIG. 6, in accordance with one embodiment. As an option, the present graphical user interface 700 may be implemented in the context of the system components, methods, and graphical user interfaces of the previous figures. Of course, the present graphical user interface 600 may be implemented in any desired context.

The present connection details screen 701 may be displayed by double clicking, and thus selecting, the first TCP connection from the connections list box 610 of FIG. 6. As shown, the present connection details screen 701 illustrates various alarms in an alarm window 702, which may be selected. In the present example, a "Window Size Exceeded" alarm is selected. As will soon become apparent, various sessions in a sessions list box 704 may also be selected.

Figure 8:
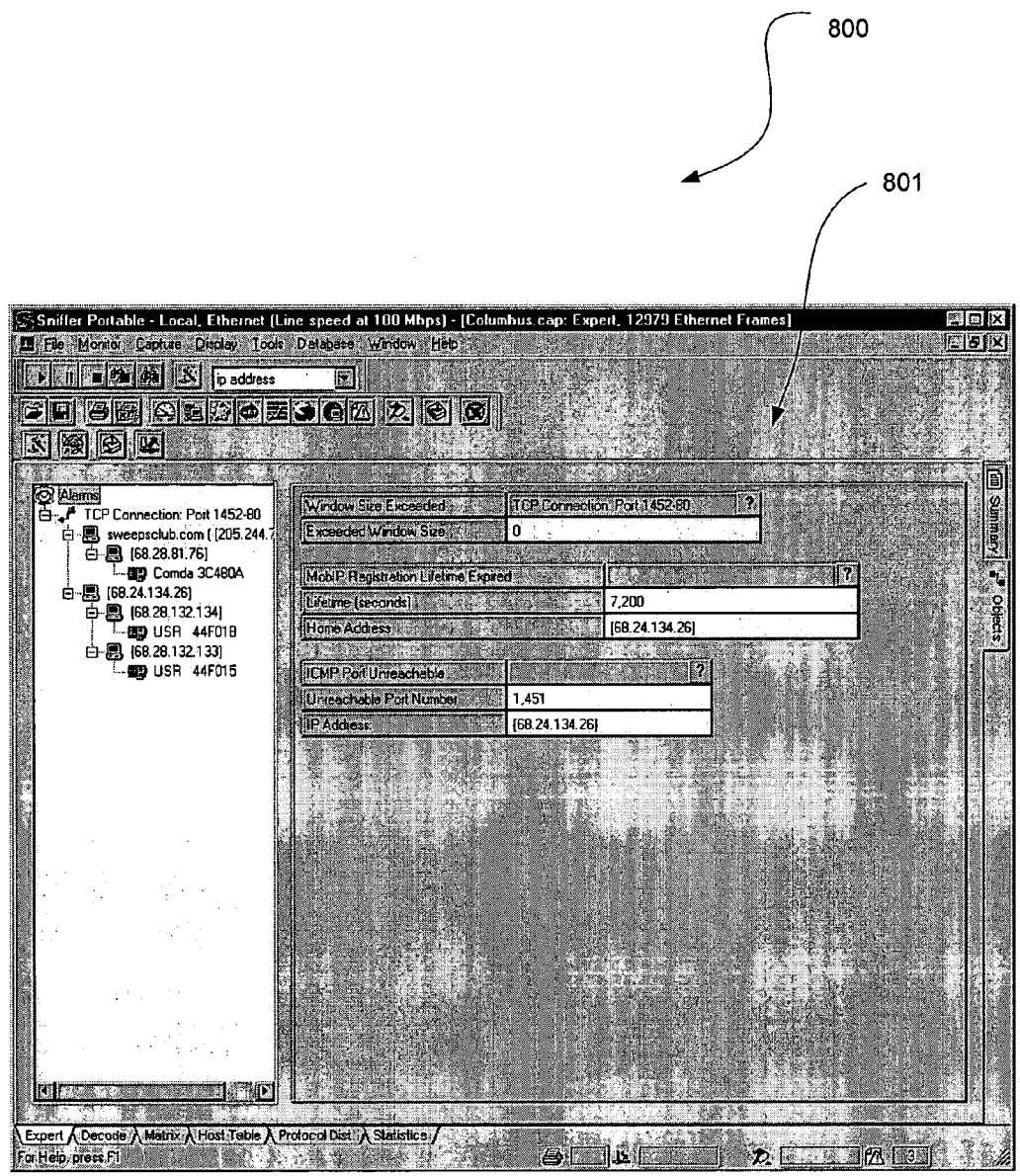
FIG. 8 illustrates a graphical user interface showing an alarm details screen of a network analyzer associated with the selected alarm of FIG. 7, in accordance with one embodiment.

FIG. 8 illustrates a graphical user interface 800 showing an alarm details screen 801 of a network analyzer associated with the selected alarm of FIG. 7, in accordance with one embodiment. As an option, the present graphical user interface 800 may be implemented in the context of the system components, methods, and graphical user interfaces of the previous figures. Of course, the present graphical user interface 800 may be implemented in any desired context.

The present alarm details screen 801 may be displayed by double clicking, and thus selecting, the first alarm from the alarm window 702 of FIG. 7. Various object linking relationships are shown by the present graphical user interface 800 associated with the "Window Size Exceeded" alarm.

For this TCP Connection, and its associated alarm, both occurring inside the tunnel, the object linking relationships are shown below in Table 8.

TABLE 8

TCP Connection 1452-80
    Sweepstakes.com (205.244.71.20) Tunneled IP (IP1)
        68.28.81.76        Tunnel Endpoint (IP3)
        Comda        IP3 DLC
        68.24.134.26        Tunneled IP (IP2)
        68.28.132.134        *Link from another cx
        USR        DLC
        68.28.132.133        Tunnel Endpoint (IP4)
        USR        IP4 DLC In the case of IP tunneling, the DLC fields contain the tunnel endpoint information. In this case, it shows that 68.28.132.133 and 68.28.81.76 are carrying the connection between 0.26 and 0.20. 68.28.132.134 is a link from another connection in which it was an endpoint for 68.24.134.26.

Figure 9:
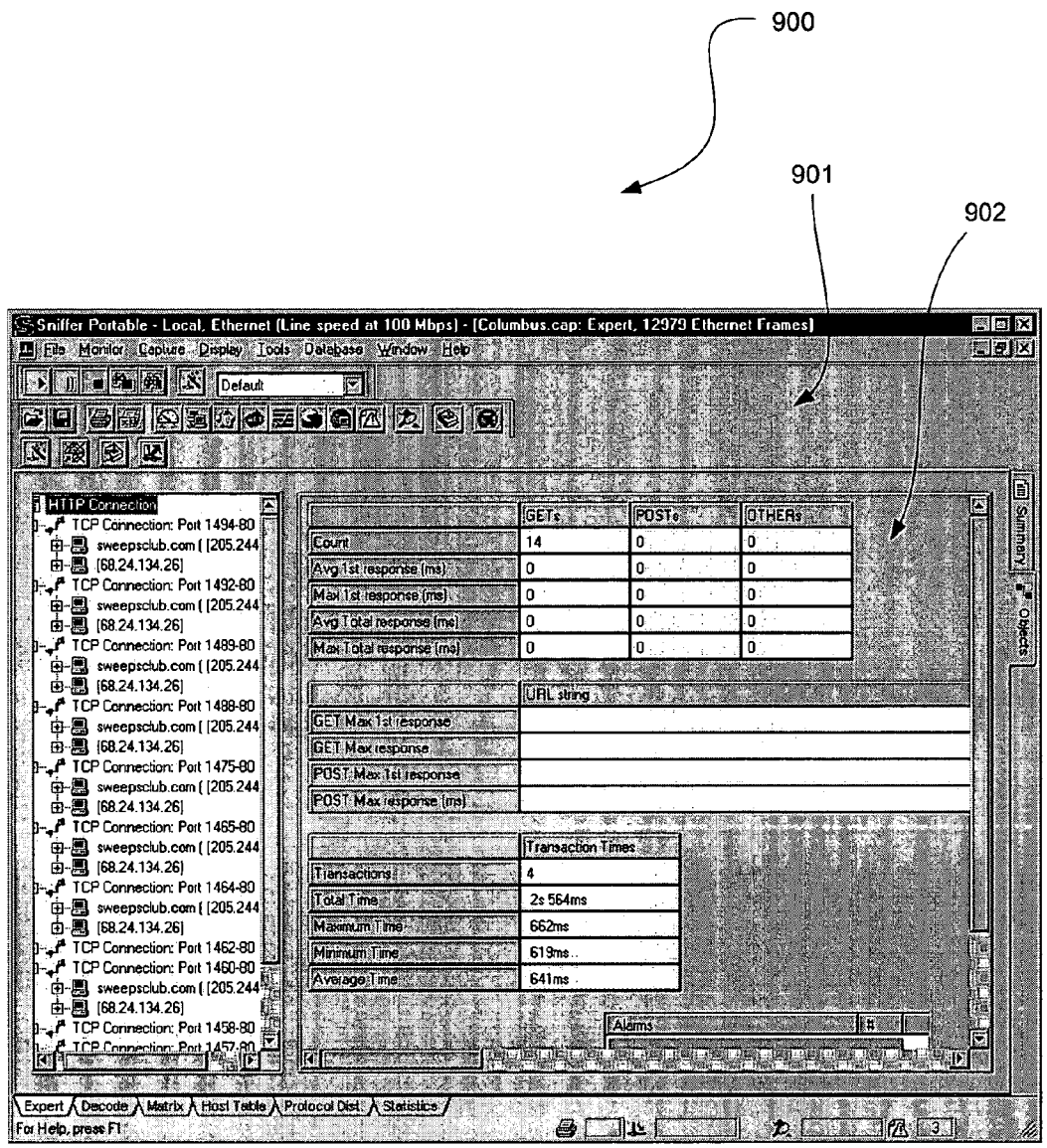
FIG. 9 illustrates a graphical user interface showing an HTTP connection details screen of a network analyzer associated with the selected session of FIG. 7, in accordance with one embodiment.

FIG. 9 illustrates a graphical user interface 900 showing an HTTP connection details screen 901 of a network analyzer associated with the selected session of FIG. 7, in accordance with one embodiment. As an option, the present graphical user interface 900 may be implemented in the context of the system components, methods, and graphical user interfaces of the previous figures. Of course, the present graphical user interface 900 may be implemented in any desired context.

It should be noted that the present HTTP connection details screen 901 may be displayed by double clicking, or otherwise selecting, the "HTTP Connection" in the sessions list box 704 of FIG. 7. Such selection reveals the present HTTP connection details screen 901 that lists all of the individual TCP connections made for the present HTTP connection. A plurality of transaction times 902 are displayed which occurred inside the tunnel.

Figure 10:
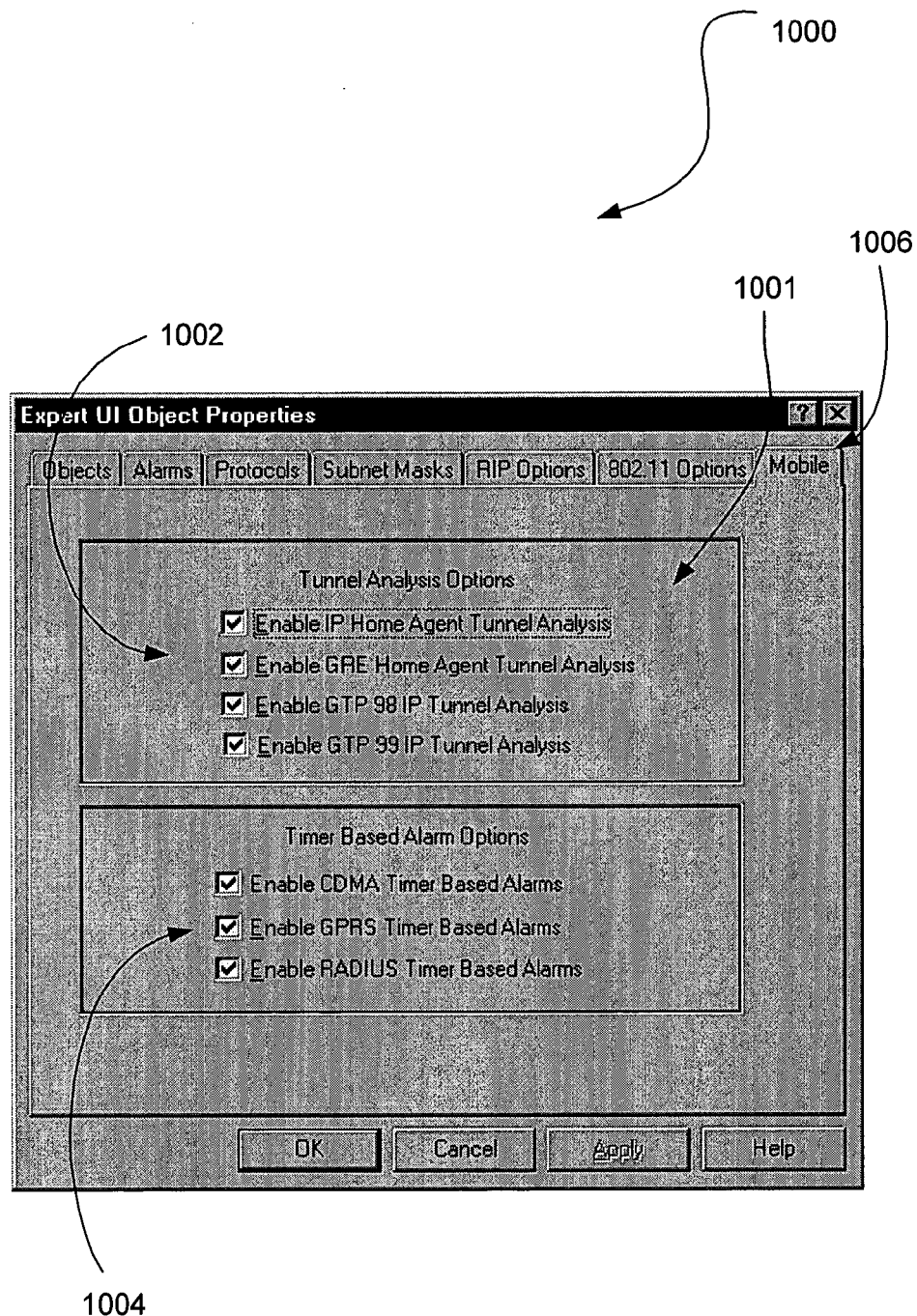
FIG. 10 illustrates a graphical user interface showing a user-selectable tunnel option screen of a network analyzer, in accordance with one embodiment.

FIG. 10 illustrates a graphical user interface 1000 showing a user-selectable tunnel option screen 1001 of a network analyzer, in accordance with one embodiment. As an option, the present graphical user interface 1000 may be implemented in the context of the system components, methods, and graphical user interfaces of the previous figures. For example, such screen 1001 may be displayed in accordance with operation 454 of FIG. 4A. Of course, the present graphical user interface 1000 may be implemented in any desired context.

As shown, various tunneling operations may be enabled/disabled by selecting various tunnel check boxes 1002. Moreover, various alarm features may be enabled/disabled by selecting various tunnel check boxes 1004. These various options may be accessed by selection of the mobile tab 1006 of a properties screen.

For example, in use, IP home agent tunnel analysis can be disabled to optimize performance by un-checking an "Enable IP Home Agent Tunnel Analysis" check box. Moreover, GRE home agent tunnel analysis may be disabled to optimize performance by un-checking the "Enable GRE Home Agent Tunnel Analysis" check box shown. Still yet, GTP 98 IP tunnel analysis may be disabled to optimize performance by un-checking the "Enable GTP 98 IP Tunnel Analysis" check box, and so on. Even still, GTP 99 IP tunnel analysis may be disabled to optimize performance by un-checking the "Enable GTP 99 IP Tunnel Analysis" check box.

More information regarding the GRE home agent tunnel analysis and GTP 98 IP tunnel analysis will now be set forth in greater detail.

Figure 11:
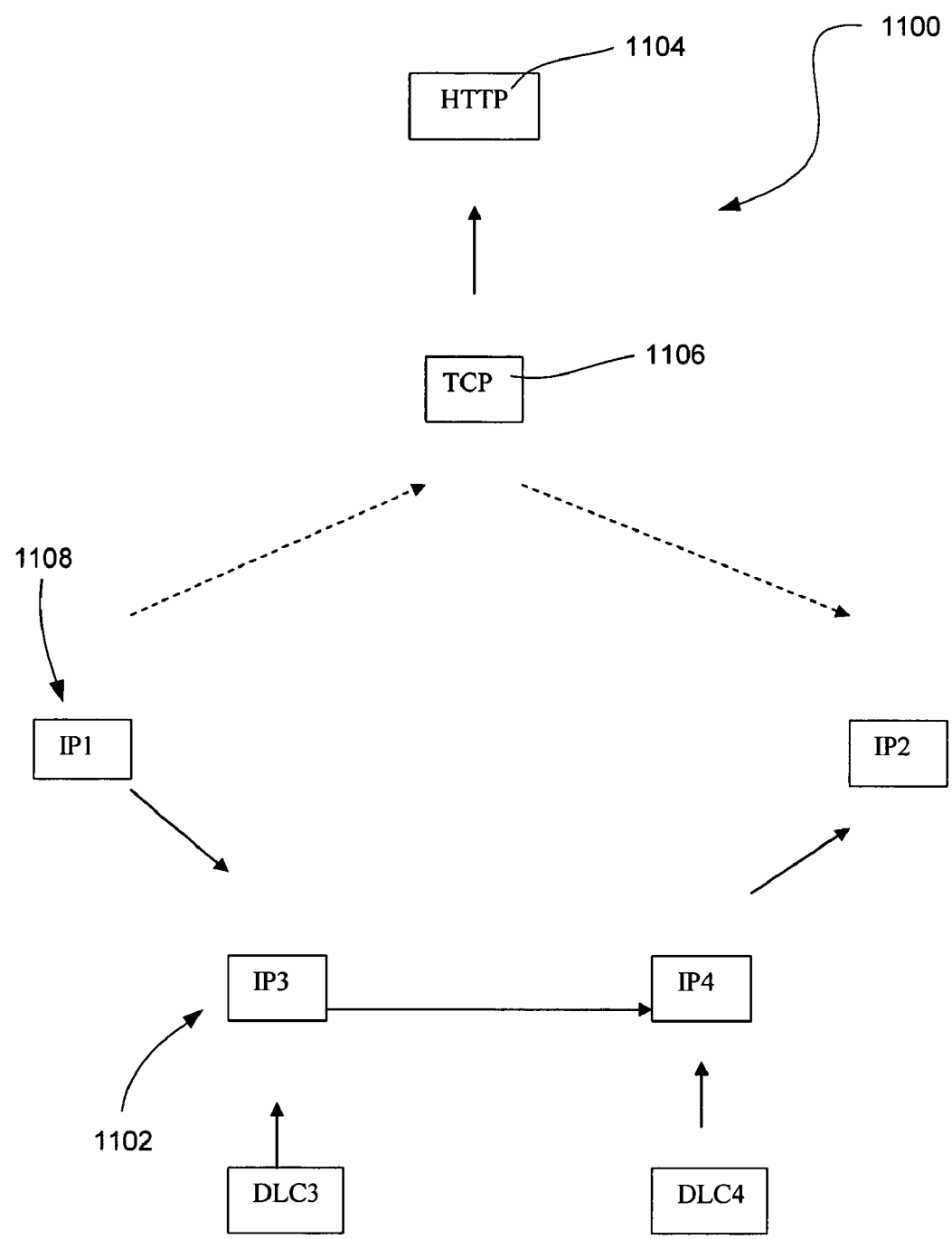
FIG. 11 illustrates a model as to how Generic Routing Encapsulation (GRE) tunneling may work in the context of a network analyzer, in accordance with one embodiment.

FIG. 11 illustrates a model 1100 as to how GRE tunneling may work in the context of a network analyzer, in accordance with one embodiment. As an option, the present model 1100 may be implemented in the context of the system components and methods of the previous figures. Of course, the present model 1100 may be implemented in any desired context.

GRE tunneling is another method used to connect a packet data serving node/foreign agent (PDSN/FA) to mobile home agent (HA). In the case of GRE tunnels between the PDSN/FA and HA, a separate object need not necessarily be created. Instead, the IP objects may be linked in such a way as to logically portray the relationship between the tunnel endpoints and the stations conversing inside the tunnel. The IP EPI may again be called recursively to analyze the conversation inside the tunnel.

As shown, IP3 and IP4 endpoints 1102 represent the GRE tunnel endpoints that are carrying an HTTP session 1104 in a TCP conversation 1106 between stations IP1 and IP2 1108 (dashed line). In this scenario, IP1 is issuing an HTTP Get to IP2 over a GRE tunnel connected by IP3 and IP4 (solid line). This conversation is represented in the frame in the manner set forth in Table 9.

TABLE 9

| ETHER DLC | | |
|---|---|---|
| IP | SA = IP3 (tunnel endpoint) | DA = IP4 (tunnel endpoint) |
| GRE | | |
| IP | SA = IP1 | DA = IP2 |
| TCP | | |
| HTTP | | |

Figure 12:
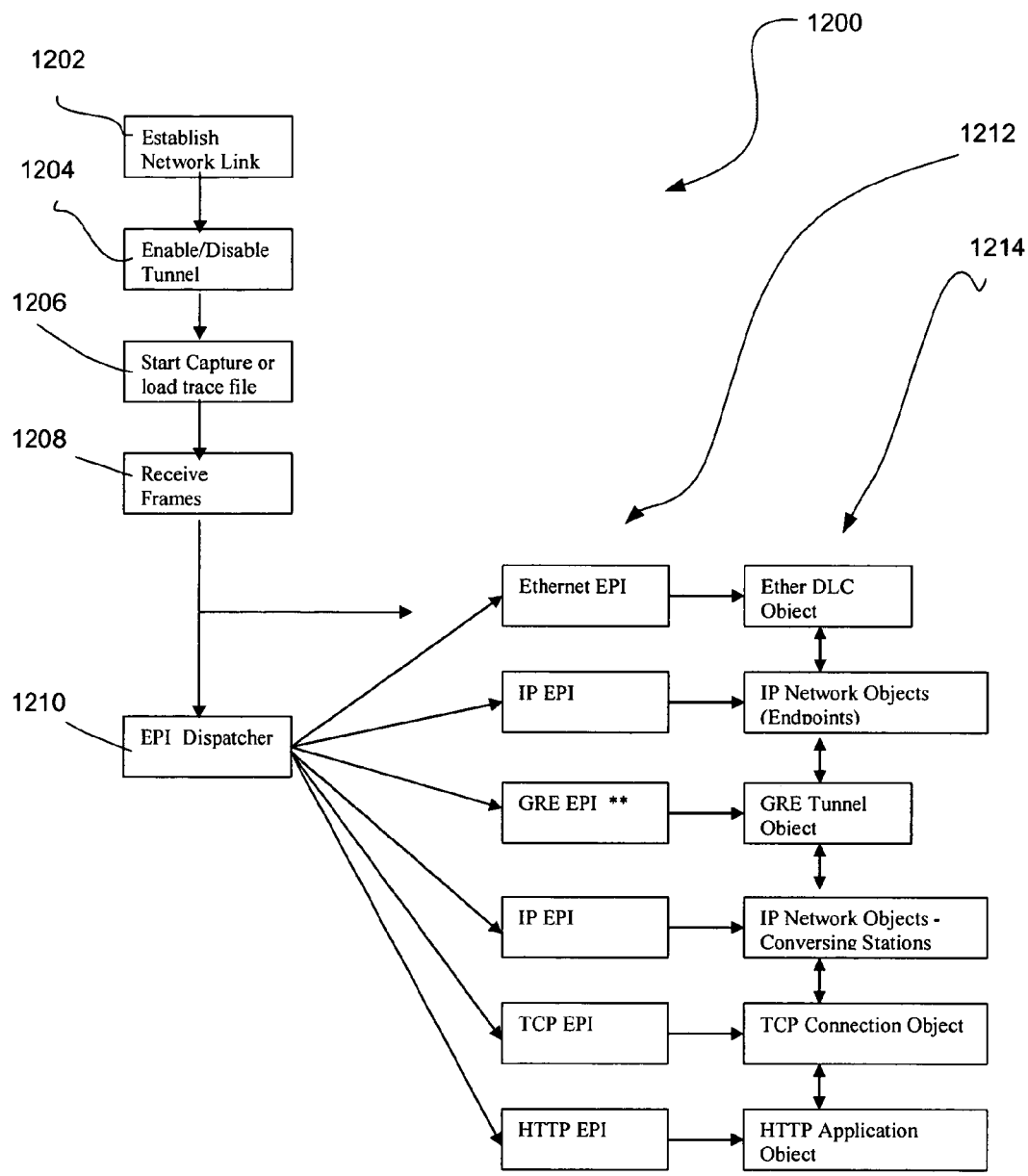
FIG. 12 illustrates one exemplary method for capturing and selectively analyzing data frames transmitted between stations in a wireless communications network, in the context of a GRE tunneled HTTP frame.

FIG. 12 illustrates one exemplary method 1200 for capturing and selectively analyzing data frames transmitted between stations in a wireless communications network, in the context of a GRE tunneled HTTP frame. As an option, the present method 1200 may be implemented in the context of the systems and methods of previous figures. Of course, the present method 1200 may be implemented in any desired context.

As shown, a network link is first established in operation 1202, after which it is determined whether tunnel analysis is enabled in operation 1204. A capture session is then initiated or a trace file is loaded in operation 1206, in order to prompt the receipt of data frames. See operation 1208.

An EPI dispatcher 1210 then executes various EPIs 1212 (i.e. Ethernet, IP(1), GRE, IP(2), TCP, HTTP, etc.), which, in turn, create various objects 1214 in the manner set forth during reference to FIG. 3. It should be noted that a GRE object may or may not be present, depending on final testing/implementation. Such objects 1214 may then be processed and displayed in various ways. More exemplary information regarding such displaying will now be set forth in greater detail.

Figure 13:
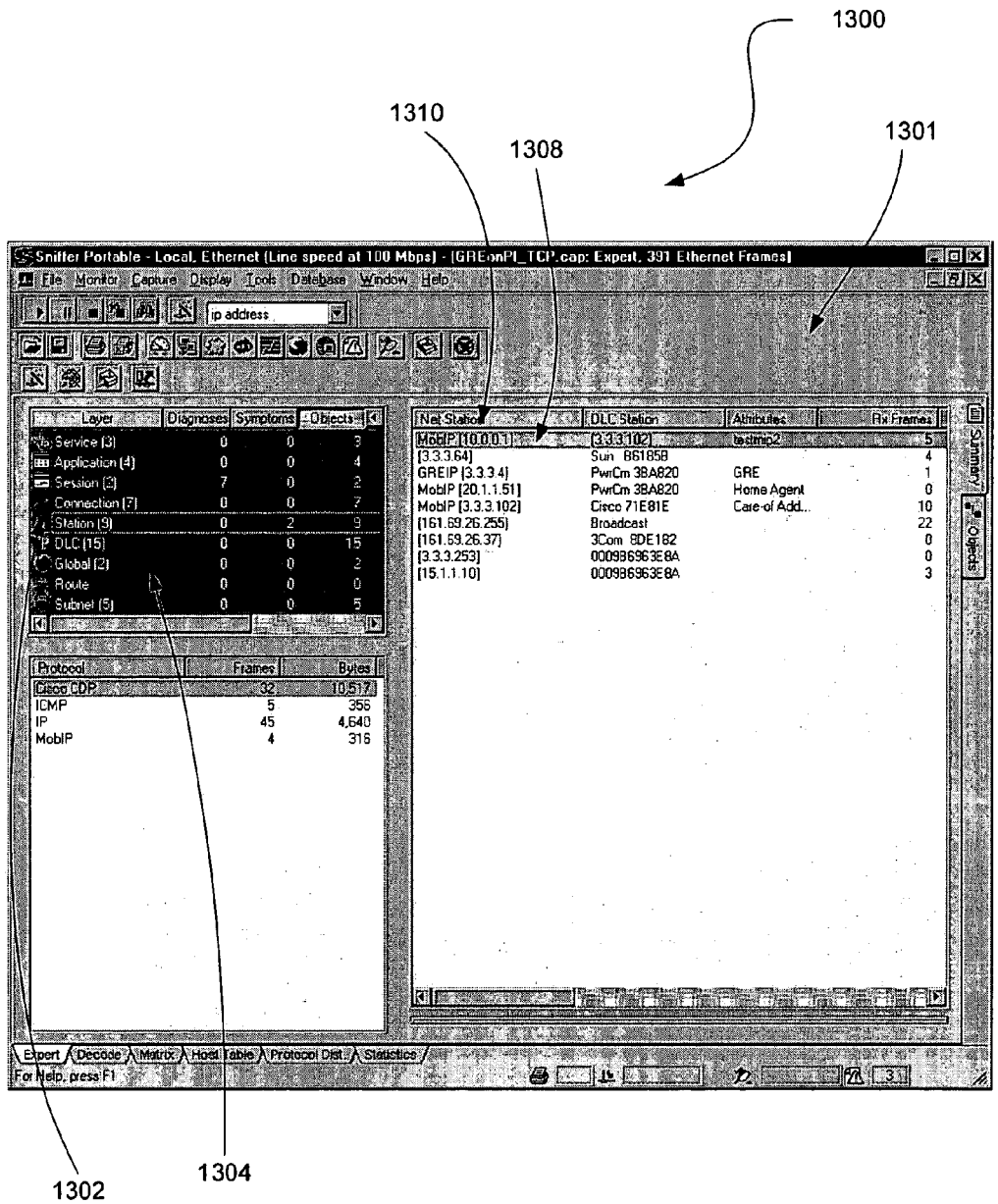
FIG. 13 illustrates a graphical user interface showing a station layer summary screen of a network analyzer, in the context of a GRE tunneled HTTP frame, where the highlighted station is mobile station "testmip2".

FIG. 13 illustrates a graphical user interface 1300 showing a station layer summary screen 1301 of a network analyzer, in the context of a GRE tunneled HTTP frame, where the highlighted station is mobile station "testmip2". As an option, the present graphical user interface 1300 may be implemented in the context of the system components, methods, and graphical user interfaces of the previous figures. Of course, the present graphical user interface 1300 may be implemented in any desired context.

Such station layer summary screen 1301 may be displayed in response to the user selection of a station icon 1302 in a separate window 1304. As shown in the station layer summary screen 1301 of the present graphical user interface 1300, 3.3.3.102 address 1308 is labeled as a mobile care-of-address. It is one endpoint of a GRE tunnel connected to endpoint 20.1.1.51. Stations found inside a GRE tunnel may be prefixed by "GREIP" in a net station column 1310 of the station layer summary screen 1301. However, if a tunnel endpoint is a mobile IP care-of-address, a COA label may have precedence over GRE. Byte counts distinguish between stations inside the tunnel and endpoints.

Figure 14:
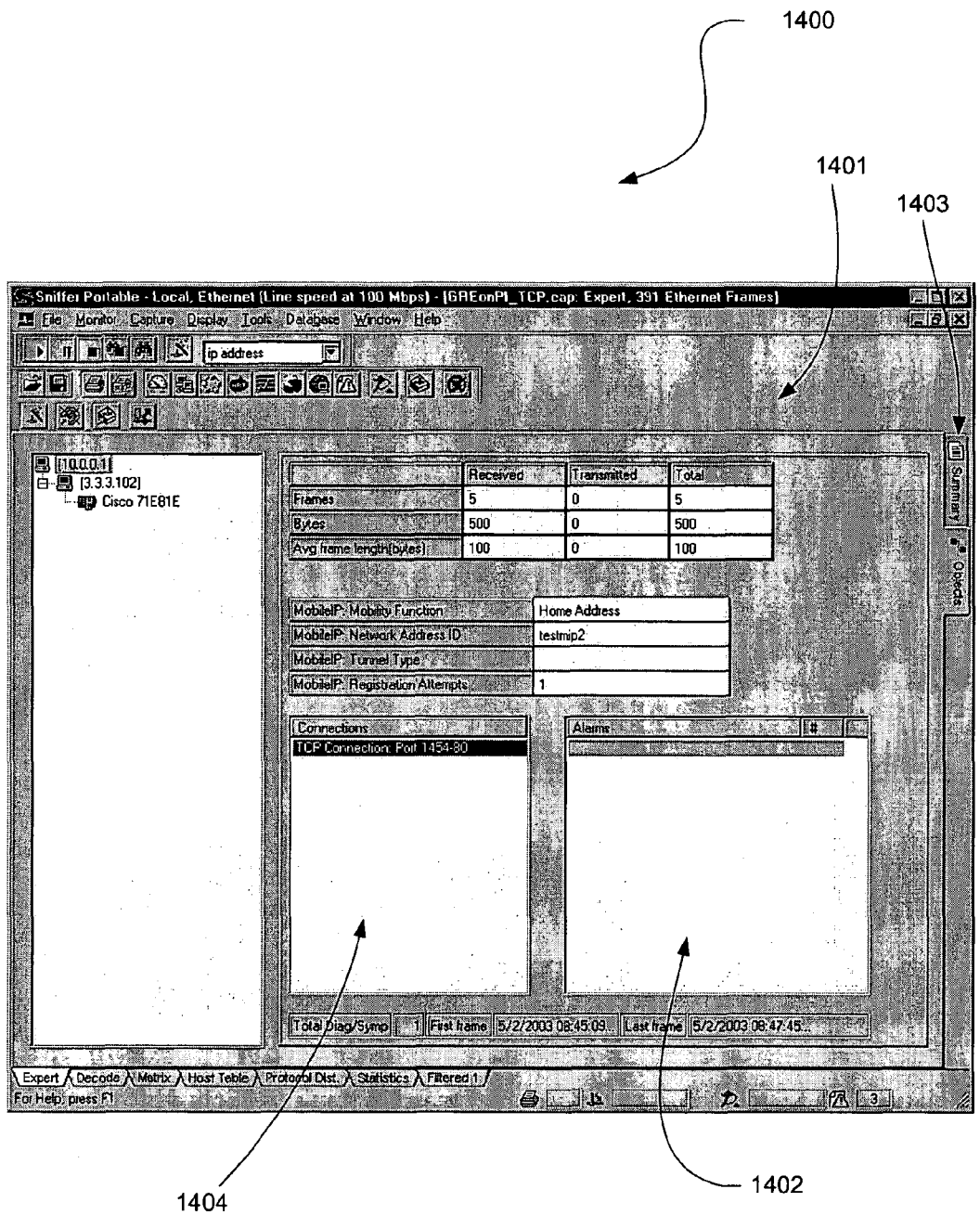
FIG. 14 illustrates a graphical user interface showing an object details screen for mobile station "testmip2" of a network analyzer associated with the selected object of FIG. 13, in the context of a GRE tunneled HTTP frame.

FIG. 14 illustrates a graphical user interface 1400 showing an object details screen 1401 for mobile station "testmip2" of a network analyzer associated with the selected object of FIG. 13, in the context of a GRE tunneled HTTP frame. As an option, the present graphical user interface 1400 may be implemented in the context of the system components, methods, and graphical user interfaces of the previous figures. Of course, the present graphical user interface 1400 may be implemented in any desired context. In use, the object details screen 1401 may be prompted by selection of tabs 1403 associated with the object details screen 1401. Of course, one may return to the screen of FIG. 13 by using such tabs 1403. As shown, the object details screen 1401 contains detailed information for the home address 10.0.0.1 indicated in FIG. 13. As shown, a connections list box 1404 for this object contains a TCP connection. Selecting (i.e. double clicking, etc.) such object brings up associated detail screen shown in FIG. 15.

Figure 15:
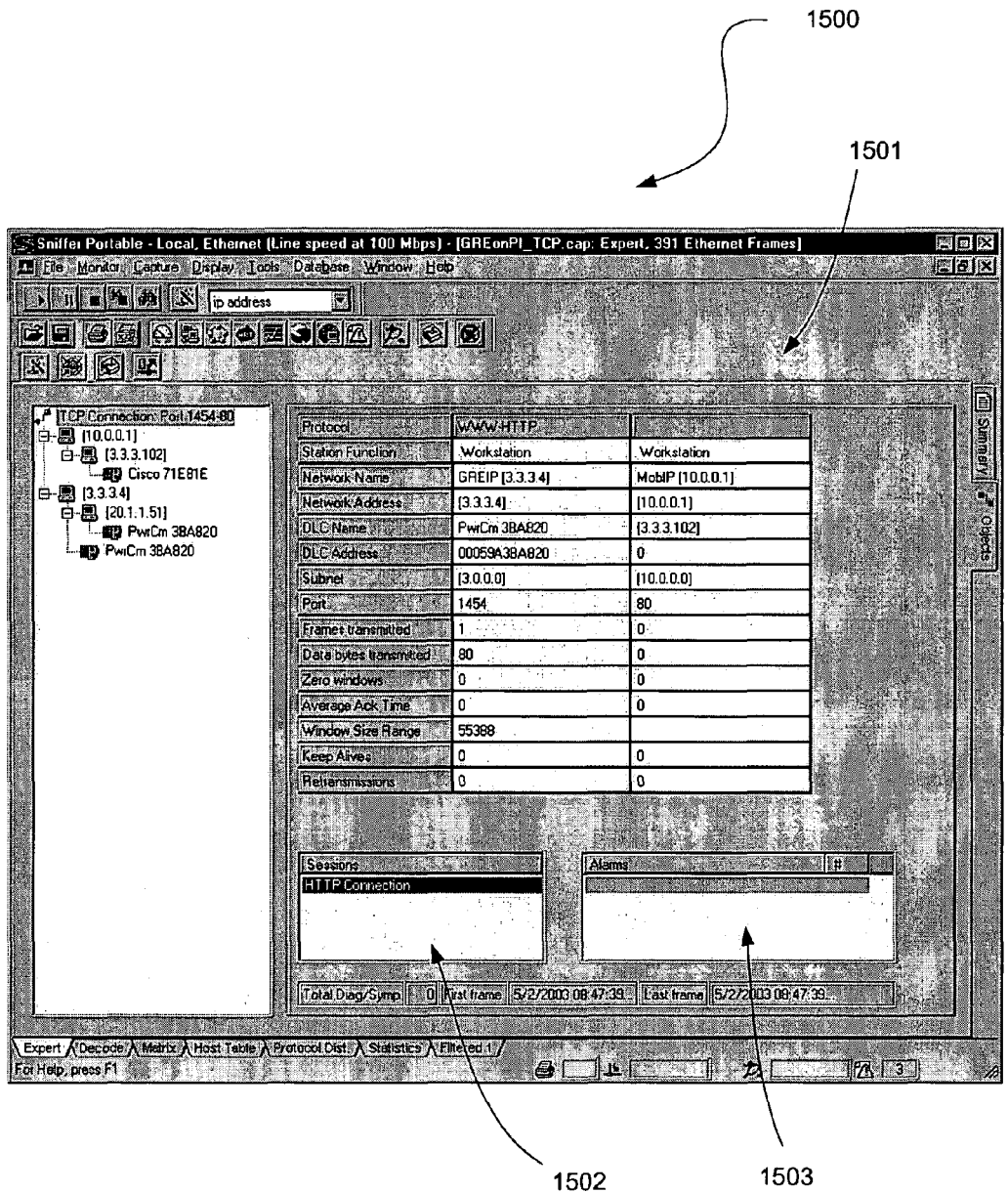
FIG. 15 illustrates a graphical user interface showing a TCP connection object details screen of a network analyzer associated with the selected mobile station object of FIG. 14, in the context of a GRE tunneled HTTP frame.

FIG. 15 illustrates a graphical user interface 1500 showing a TCP connection object details screen 1501 of a network analyzer associated with the selected mobile station object of FIG. 14, in the context of a GRE tunneled HTTP frame. As an option, the present graphical user interface 1500 may be implemented in the context of the system components, methods, and graphical user interfaces of the previous figures. Of course, the present graphical user interface 1500 may be implemented in any desired context.

The present connection details screen 1501 may be displayed by double clicking, and thus selecting, the TCP connection from the connections list box 1404 of FIG. 14. As shown, the present connection details screen 1501 illustrates various alarms, if present, in an alarm window 1503, which may be selected. Further shown is a sessions list box 1504.

The present connection details screen 1501 may be displayed by double clicking, and thus selecting, the TCP connection from the connections list box 1404 of FIG. 14 The object linking relationship of the present TCP connection breaks down as follows in Table 10.

TABLE 10

| TCP Connection 1452-80 | |
|---|---|
| 10.0.0.1 | Tunneled IP (IP1) |
| 3.3.3.102 | Tunnel Endpoint (IP3) |
| Cisco | IP3 DLC |
| 3.3.3.4 | Tunneled IP (1P2) |
| 20.1.1.51 | Tunnel Endpoint (IP4) |
| PwrCm | IP4 DLC |
| PwrCm | IP4 DLC CA non-tunneled frame was also sent by 3.3.3.4) |

Figure 16:
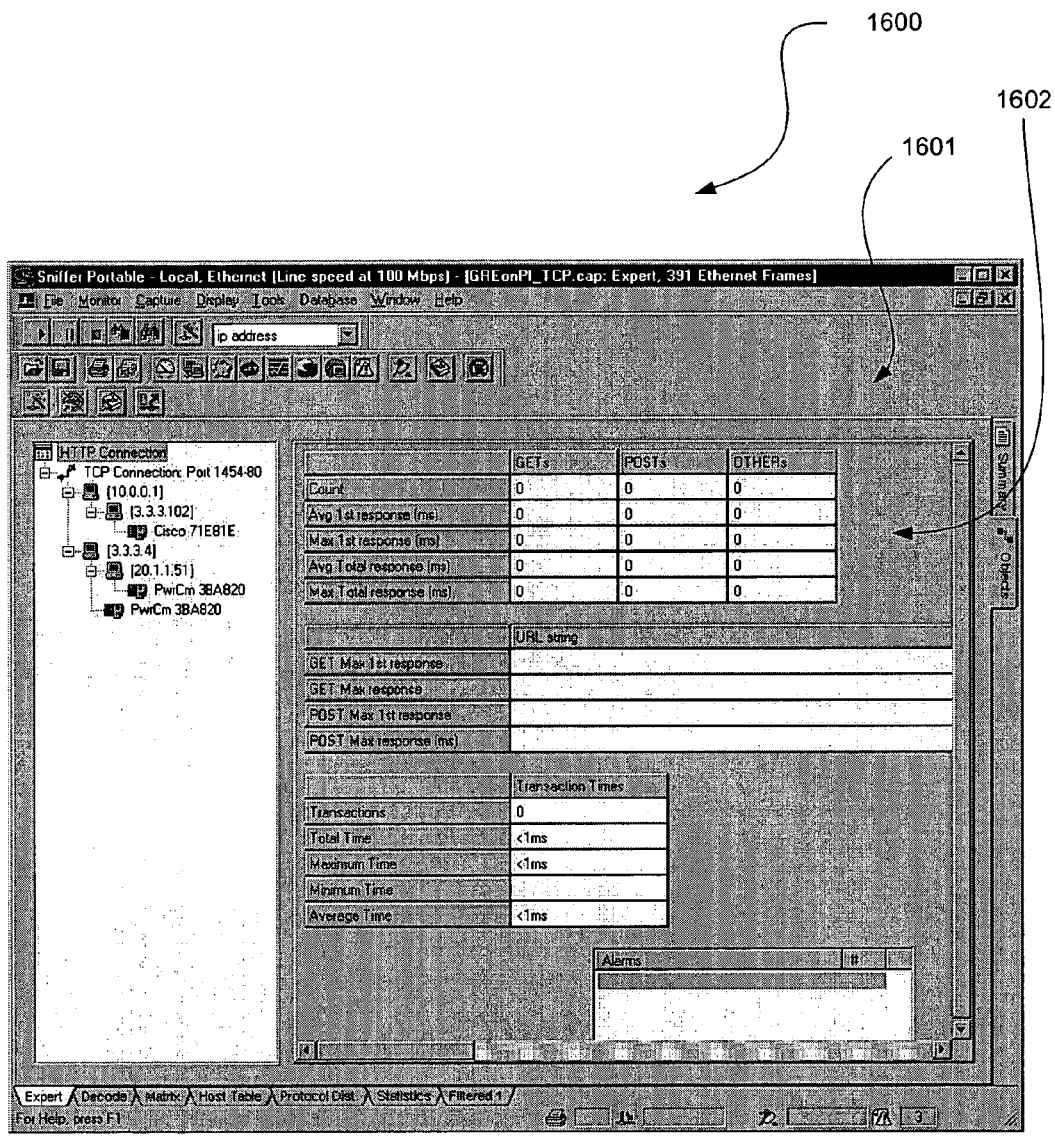
FIG. 16 illustrates a graphical user interface showing the HTTP connection details screen of a network analyzer associated with the selected TCP connection of FIG. 15, in the context of a GRE tunneled HTTP frame.

Double clicking the HTTP connection object in a session list box 1502 illustrates the HTTP connection details screen of FIG. 16.

FIG. 16 illustrates a graphical user interface 1600 showing an HTTP connection details screen 1601 of a network analyzer associated with the selected object of FIG. 15, in the context of a GRE tunneled HTTP frame. As an option, the present graphical user interface 1600 may be implemented in the context of the system components, methods, and graphical user interfaces of the previous figures. Of course, the present graphical user interface 1600 may be implemented in any desired context.

It should be noted that the present HTTP connection details screen 1601 may be displayed by double clicking, or otherwise selecting, the HTTP connection object in the sessions list box 1502 of FIG. 15. Such selection reveals the present HTTP connection details screen 1601 that lists all of the individual TCP connections made for the present HTTP connection. A plurality of transaction times 1602 are displayed which occurred inside the tunnel.

Figure 17:
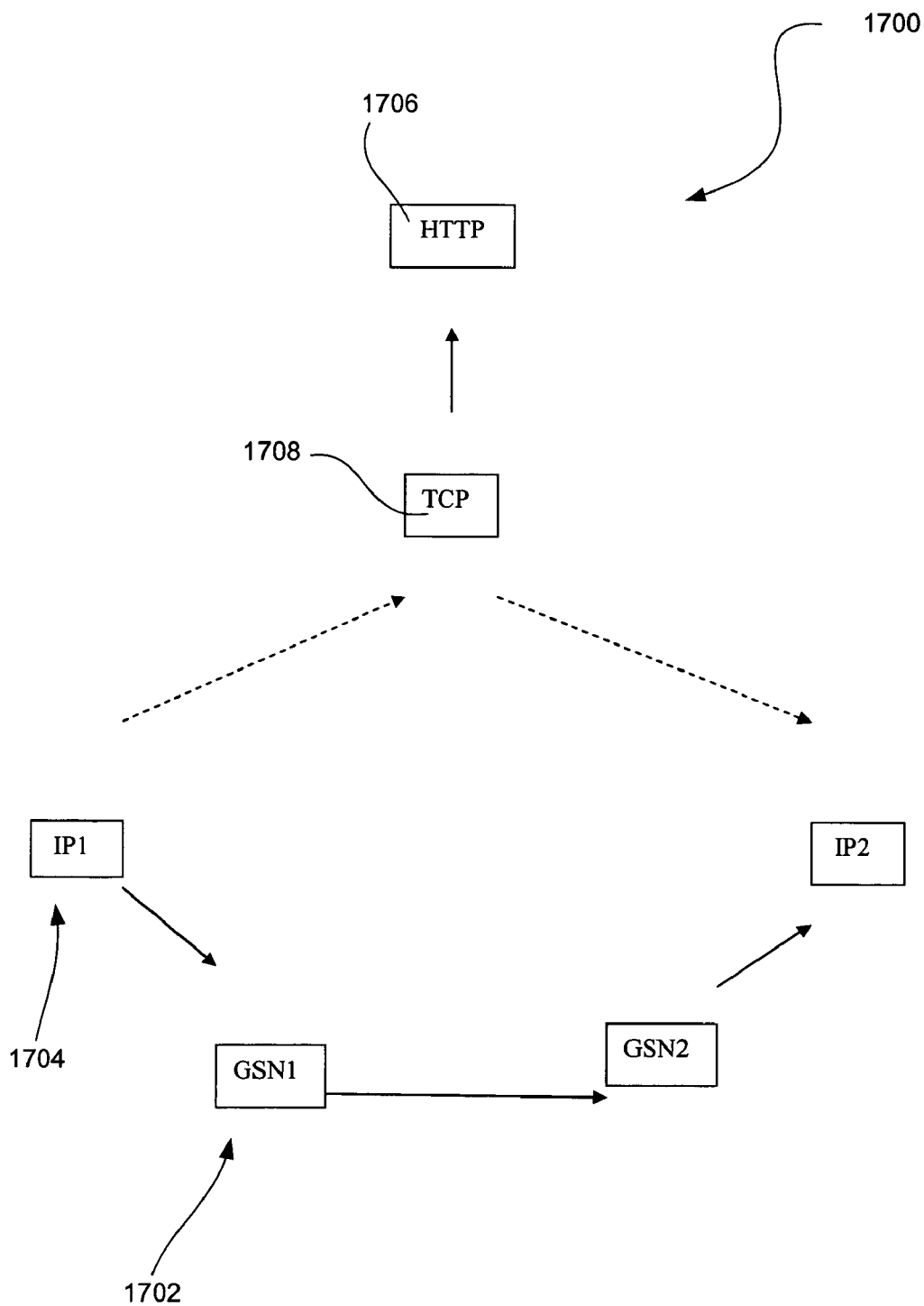
FIG. 17 illustrates a model as to how a GTP tunnel carries an IP conversation such as HTTP, in accordance with one embodiment.

FIG. 17 illustrates a model 1700 as to how a GTP tunnel carries an IP conversation such as HTTP, in accordance with one embodiment. As an option, the present model 1700 may be implemented in the context of the system components and methods of the previous figures. Of course, the present model 1700 may be implemented in any desired context.

In the case of IP tunneling, DLC fields contain tunnel endpoint information. In the present case, it shows that endpoints GSN1 and GSN2 1702 are carrying the connection between IP1 and IP2 stations 1704.

In the present model 1700, the GSN1 and GSN2 1702 represent endpoints that are carrying an HTTP session 1706 in a TCP conversation 1708 between IP1 and IP2 (dashed line). In this scenario, IP1 is issuing an HTTP Get to IP2 over a tunnel connected by GSN1 and GSN2 (solid line). This conversation is represented in the frame in Table 11.

TABLE 11

| ETHER DLC | | |
|---|---|---|
| IP | SA = GSN1 (tunnel endpoint) | DA = GSN2 (tunnel endpoint) |
| UDP | | |
| GTP | | |
| IP | SA = IP1 | DA = IP2 |
| TCP | | |
| HTTP | | |

Figure 18:
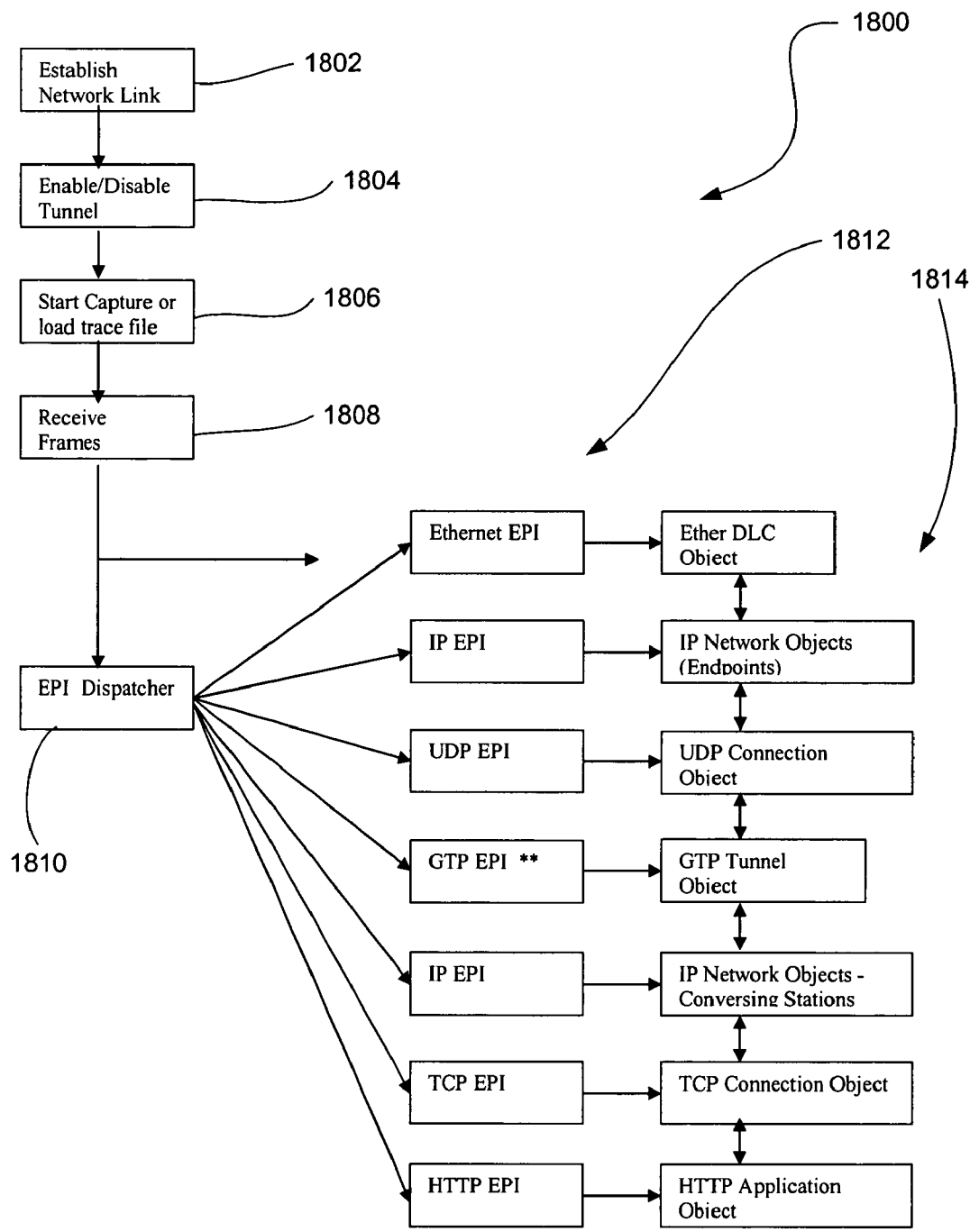
FIG. 18 illustrates one exemplary method for capturing and selectively analyzing data frames transmitted between stations in a wireless communications network, in the context of a General Packet Radio Service (GPRS) Tunnel Protocol (GTP) tunneled HTTP frame.

FIG. 18 illustrates one exemplary method 1800 for capturing and selectively analyzing data frames transmitted between stations in a wireless communications network, in the context of a GTP tunneled HTTP frame. As an option, the present method 1800 may be implemented in the context of the systems and methods of previous figures. Of course, the present method 1800 may be implemented in any desired context.

As shown, a network link is first established in operation 1802, after which it is determined whether tunnel analysis is enabled in operation 1804. A capture session is then initiated or a trace file is loaded in operation 1806, in order to prompt the receipt of data frames. See operation 1808.

An EPI dispatcher 1810 then executes various EPIs 1812 (i.e. Ethernet, IP(1), UDP, GTP, IP(2), TCP, HTTP, etc.), which, in turn, create various objects 1814 in the manner set forth during reference to FIG. 17. Such objects 1814 may then be processed and displayed in various ways. More exemplary information regarding such displaying will now be set forth in greater detail.

Figure 19:
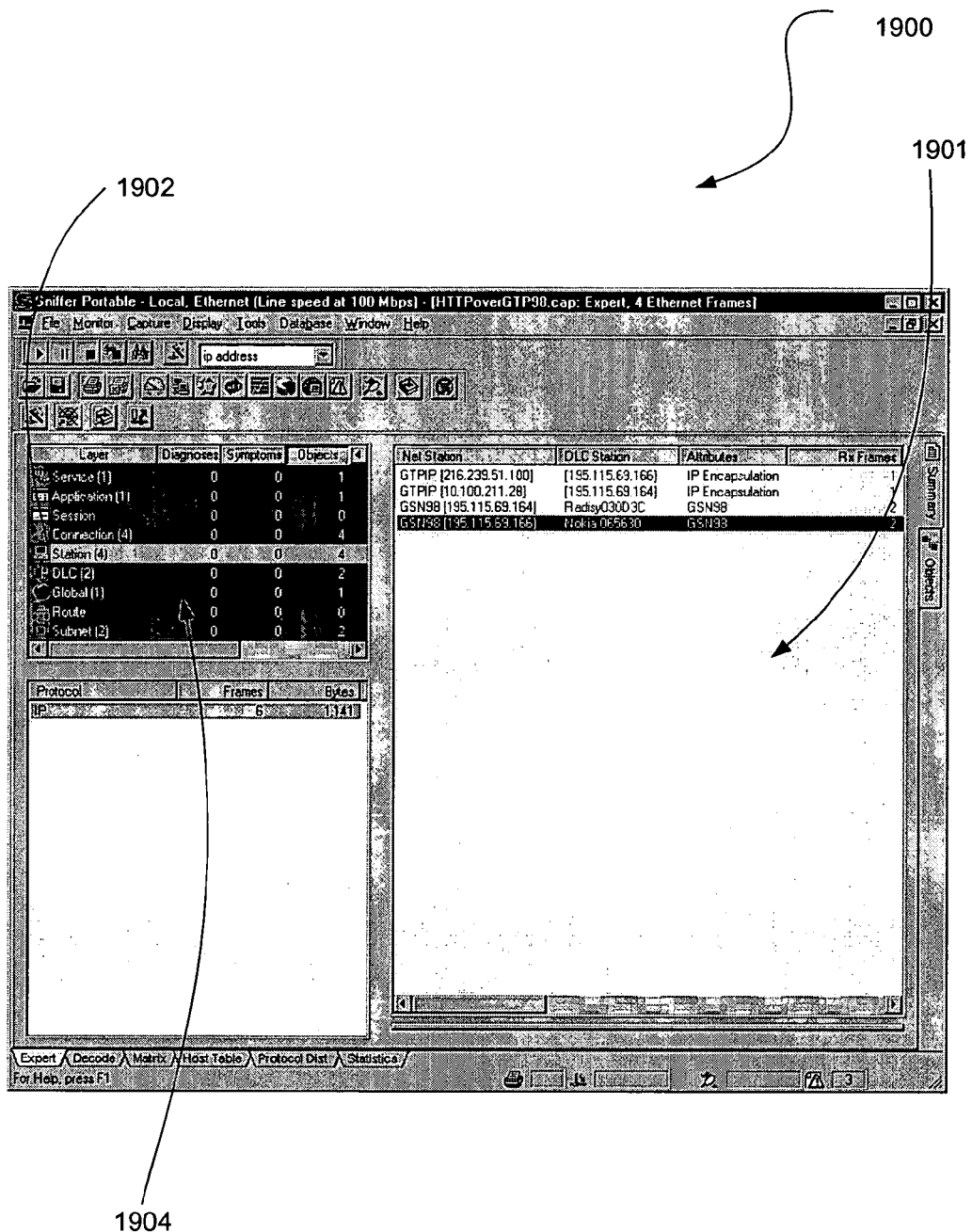
FIG. 19 illustrates a graphical user interface showing a station layer summary screen of a network analyzer, in the context of a GTP tunneled HTTP frame, where the highlighted station is GSN Router 195.115.69.166.

FIG. 19 illustrates a graphical user interface 1900 showing a station layer summary screen 1901 of a network analyzer, in the context of a GTP tunneled HTTP frame, where the highlighted station is GSN Router 195.115.69.166. As an option, the present graphical user interface 1900 may be implemented in the context of the system components, methods, and graphical user interfaces of the previous figures. Of course, the present graphical user interface 1900 may be implemented in any desired context.

Such station layer summary screen 1901 may be displayed in response to the user selection of a station icon 1902 in a separate window 1904. As shown in the station layer summary screen 1901 of the present graphical user interface 1900, net stations prefixed with "GSN98" represent GSN1 and GSN2 in the model discussed earlier regarding FIG. 17. The net stations prefixed with "GTPIP" represent IP1 and IP2.

In the case of IP tunneling over GTP, the "DLC Station" column contains the GSN tunnel endpoint IP address rather than DLC station information. This is also true with respect to the object detail screens. Selecting network station 195.115.69.166 shown in the present figure will bring up a detail screen for that GSN, as set forth in FIG. 20.

Figure 20:
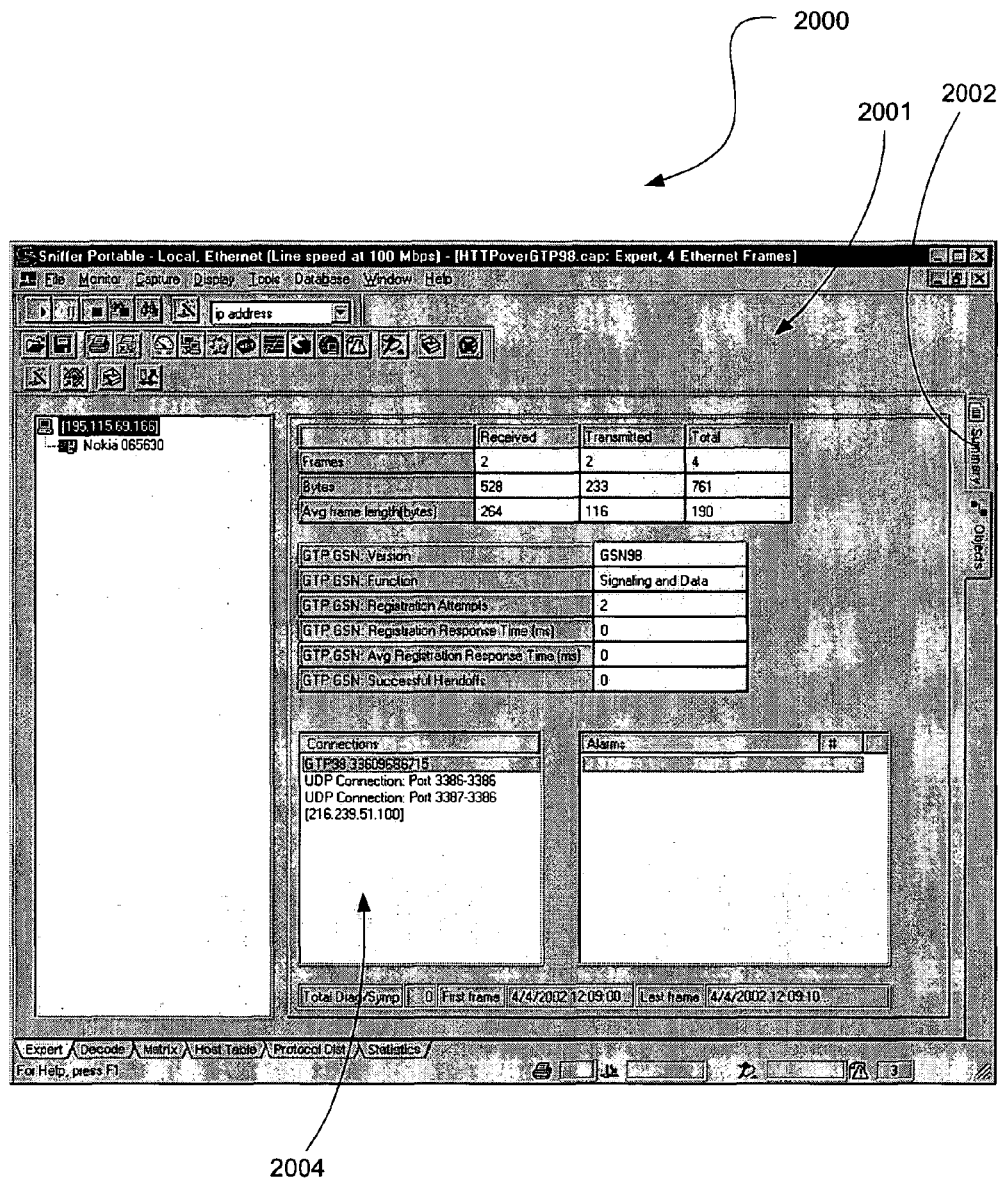
FIG. 20 illustrates a graphical user interface showing a GSN Router object's detail screen of a network analyzer associated with the selected object of FIG. 19, in the context of a GTP tunneled HTTP frame.

FIG. 20 illustrates a graphical user interface 2000 showing a GSN Router object's detail screen 2001 of a network analyzer associated with the selected object of FIG. 19, in the context of a GTP tunneled HTTP frame. As an option, the present graphical user interface 2000 may be implemented in the context of the system components, methods, and graphical user interfaces of the previous figures. Of course, the present graphical user interface 2000 may be implemented in any desired context.

In use, the object details screen 2001 may be prompted by selection of tabs 2002 associated with the object details screen 2001, and the selection of network station 195.115.69.166. Of course, one may return to the screen of FIG. 19 by using such tabs 2002. A connections list box 2004 contains any GTP UDP connections along with the IP address of the station communicating through this GSN, 216.239.51.100.

Figure 21:
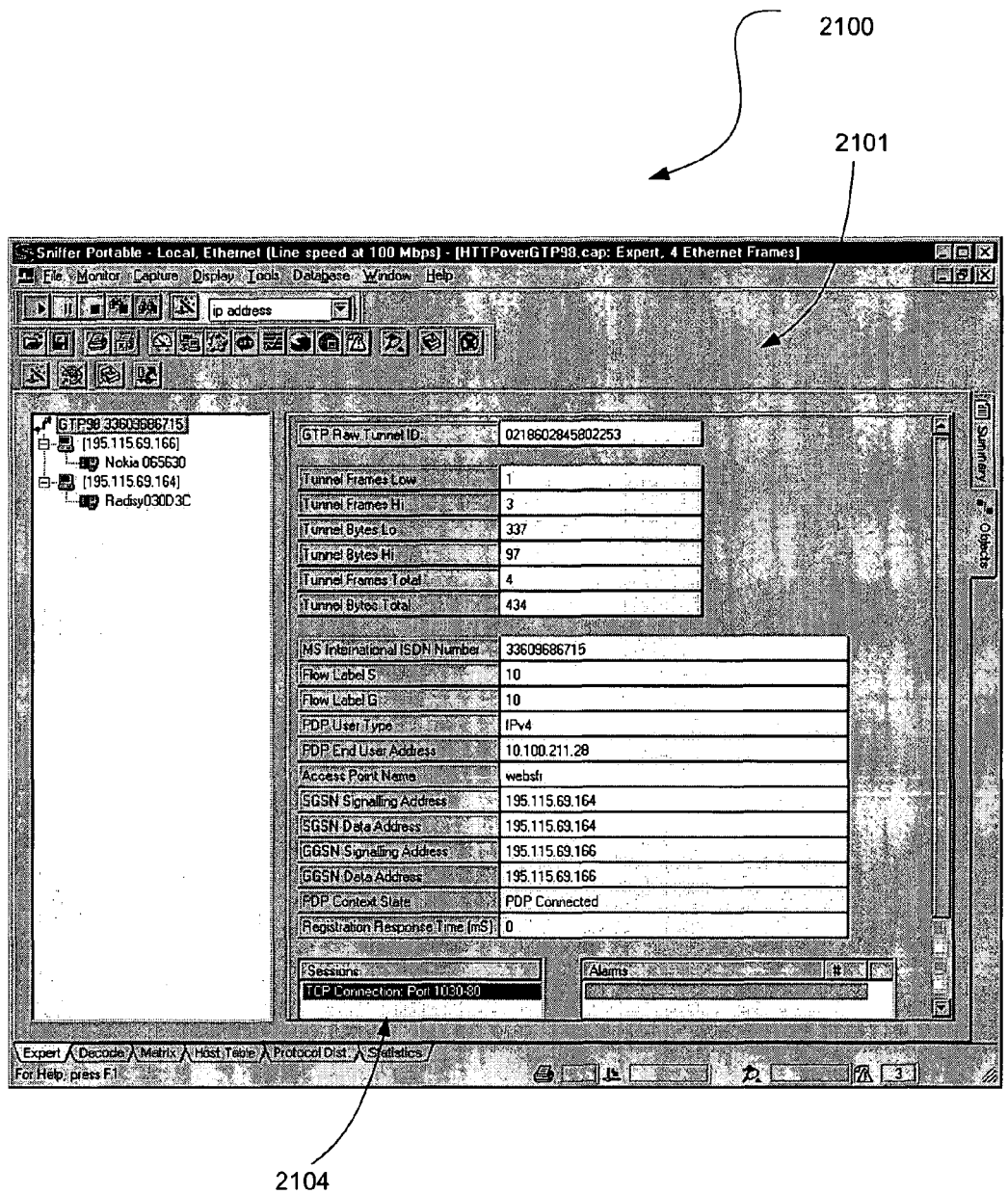
FIG. 21 illustrates a graphical user interface showing a GTP Tunnel object for MSISDN "33609686715" of a network analyzer associated with the selected connection of FIG. 19, in the context of a GTP tunneled HTTP frame.

FIG. 21 illustrates a graphical user interface 2100 showing a GTP Tunnel object for MSISDN "33609686715" of a network analyzer associated with the selected connection of FIG. 19, in the context of a GTP tunneled HTTP frame. As an option, the present graphical user interface 2100 may be implemented in the context of the system components, methods, and graphical user interfaces of the previous figures. Of course, the present graphical user interface 2100 may be implemented in any desired context.

The present connection details screen 2101 may be displayed by double clicking, and thus selecting, MSISDN "33609686715" in the connection layer summary screen 2004 of FIG. 20. In the connections list box 2104 of the present GTP tunnel details screen 2104, a TCP connection is shown for HTTP. As shown, the object relationship shows the GSN 195.115.69.166 below the GTP tunnel MSISDN "33609686715." Double clicking, or otherwise selecting, the TCP connection in the connections list box 2104 brings up a TCP connection detail screen shown in FIG. 23.

Figure 22:
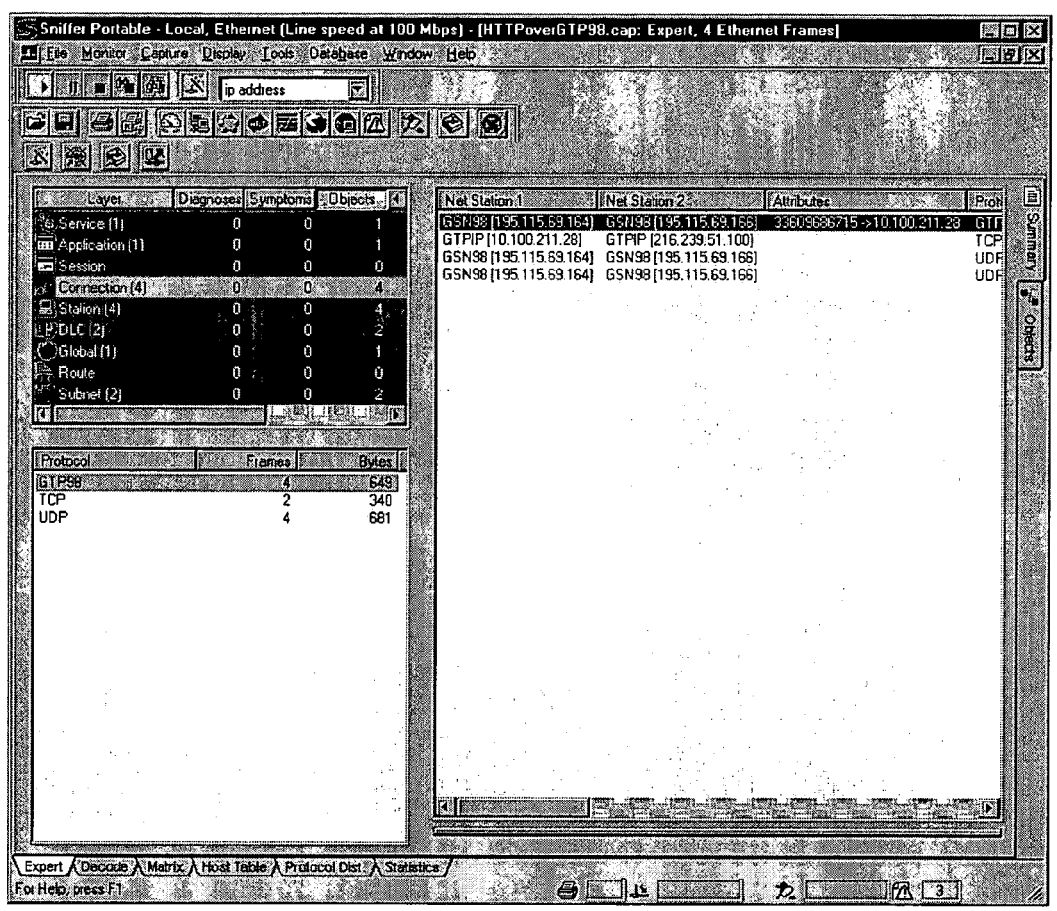
FIG. 22 illustrates a graphical user interface showing a connection layer summary screen of a network analyzer, in the context of GTP tunneled HTTP frame.

FIG. 22 illustrates a graphical user interface 2250 showing a connection layer summary screen of a network analyzer, in the context of GTP tunneled HTTP frame. The highlighted GTP object is identified as "33609686715->10.100.211.28" in the "Attributes" column. "33609686715" uniquely identifies this tunnel's MS International ISDN Number (MSISDN) and "10.100.211.28" uniquely identifies this tunnel's End User Address.

Figure 23:
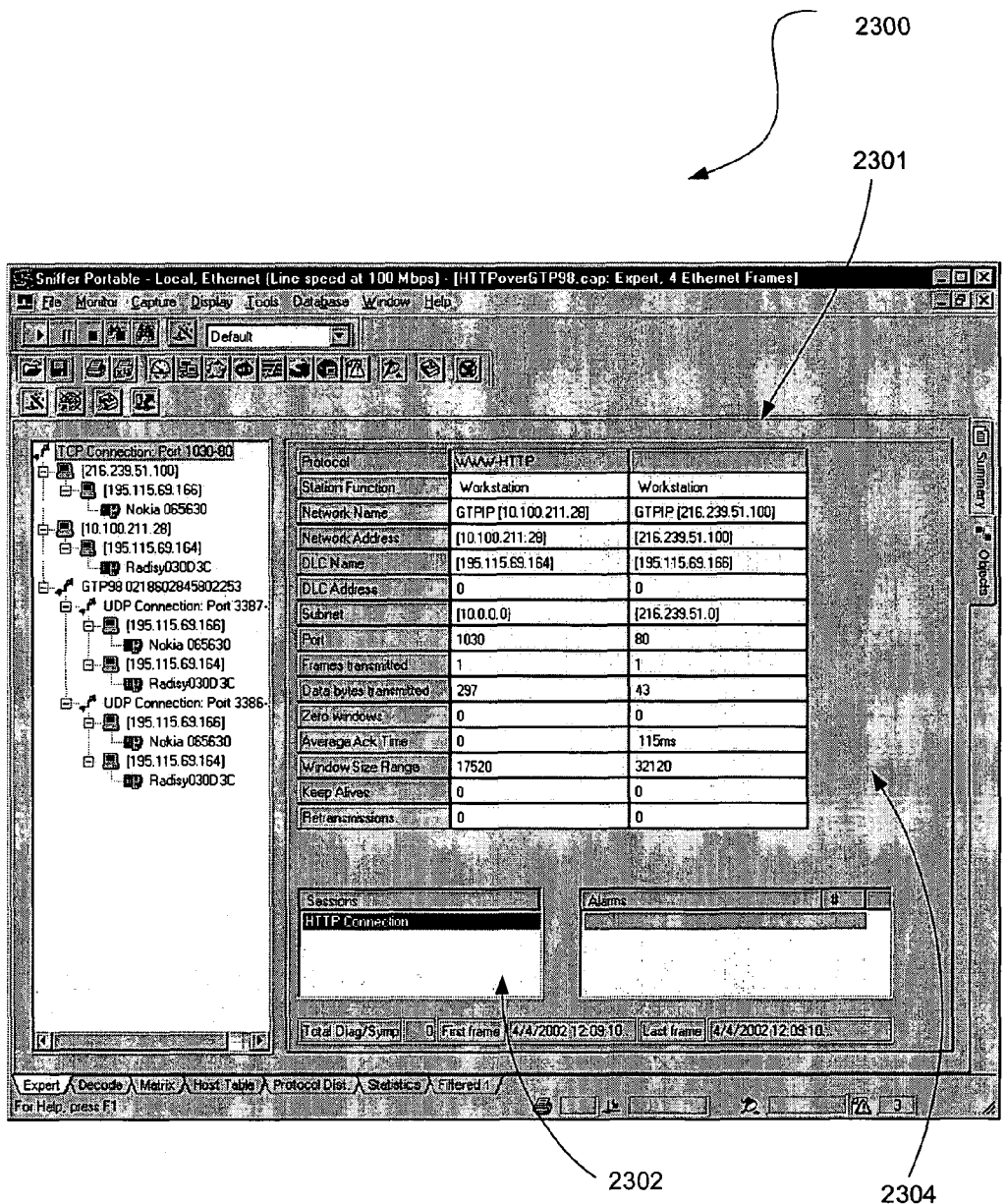
FIG. 23 illustrates a graphical user interface showing a TCP connection object's detail screen of a network analyzer associated with the selected GTP tunnel object of FIG. 21, in the context of a GTP tunneled HTTP frame.

FIG. 23 illustrates a graphical user interface 2300 showing a TCP connection object's detail screen 2301 of a network analyzer associated with the selected GTP tunnel object of FIG. 21, in the context of a GTP tunneled HTTP frame. As an option, the present graphical user interface 2300 may be implemented in the context of the system components, methods, and graphical user interfaces of the previous figures. Of course, the present graphical user interface 2300 may be implemented in any desired context.

The present connection details screen 2301 may be displayed by double clicking, and thus selecting, the TCP connection in the connections list box 2104 of FIG. 21. Double clicking, and thus selecting, the HTTP connection object in a session list box 2302 illustrates the HTTP connection details screen of FIG. 24.

Figure 24:
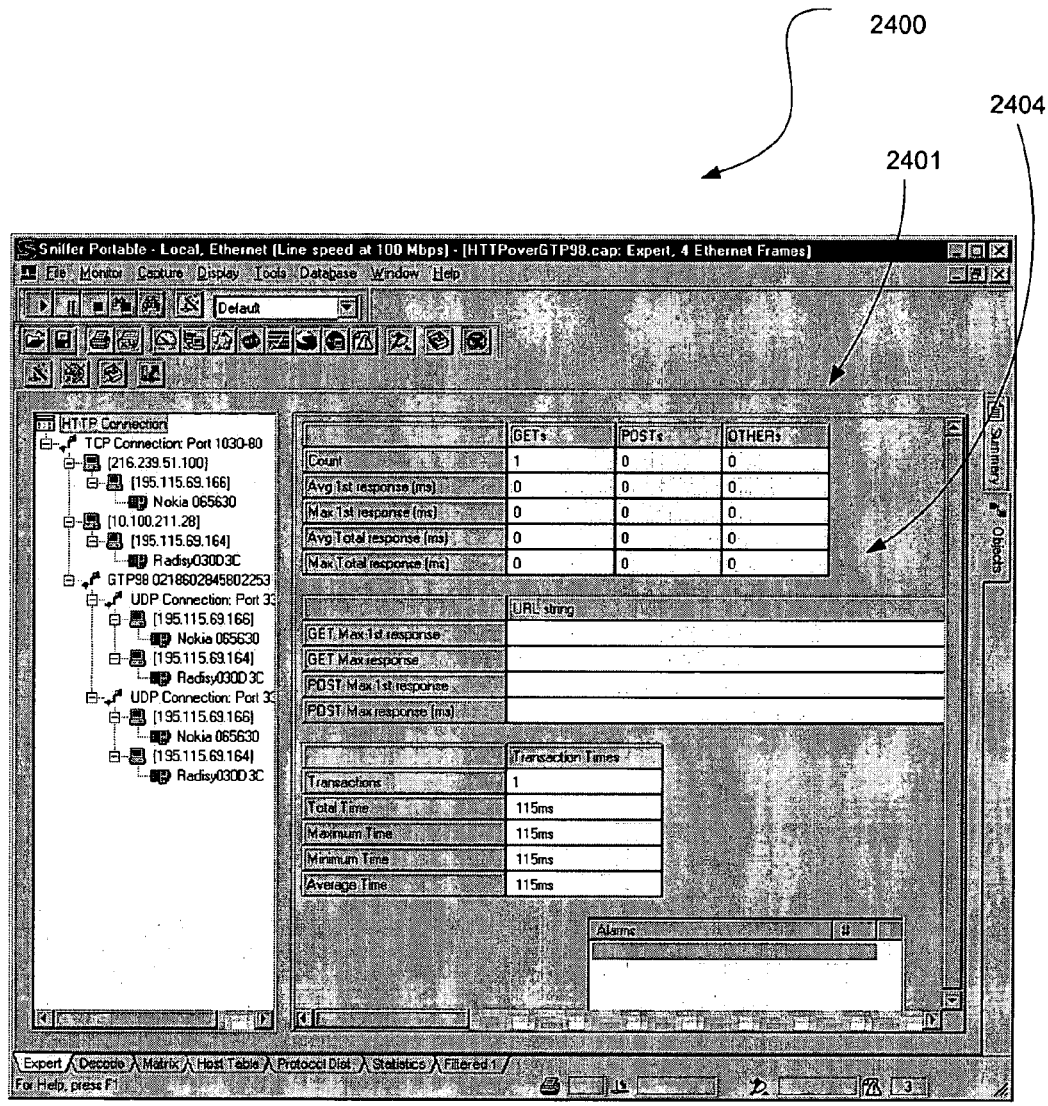
FIG. 24 illustrates a graphical user interface showing an HTTP connection details screen of a network analyzer associated with the selected TCP connection object of FIG. 23, in the context of a GTP tunneled HTTP frame.

FIG. 24 illustrates a graphical user interface 2400 showing an HTTP connection details screen 2401 of a network analyzer associated with the selected HTTP connection object of FIG. 23, in the context of a GTP tunneled HTTP frame. As an option, the present graphical user interface 2400 may be implemented in the context of the system components, methods, and graphical user interfaces of the previous figures. Of course, the present graphical user interface 2400 may be implemented in any desired context.

It should be noted that the present HTTP connection details screen 2401 may be displayed by double clicking, or otherwise selecting, the HTTP connection object in the sessions list box 2302 of FIG. 23. Such selection reveals the present HTTP connection details screen 2401 that lists all of the individual TCP connections made for the present HTTP connection. A plurality of transaction times 2404 are also displayed which occurred inside the tunnel.

Table 12 illustrates an explanation of the objects shown for the present GTP tunneled HTTP connection.

TABLE 12

| | |
|---|---|
| HTTP Connection | |
|   TCP Connection 1030-80 | |
|     216.239.51.100 | Tunneled IP (IP1) |
|     195.115.69.166 | GSN1 |
|     Nokia | GSN1 DLC |
|     10.100.211.28 | Tunneled IP (IP2) |
|     195.115.69.164 | GSN2 |
|     Radisy | GSN2 DLC |
|     GTP98 33609686715 | GTP TunnelMSISDN |
|     UDP | UDP for GTP Tunnel header |
|       195.115.69.166 | |
|       195.115.69.164 | |

Figure 25:
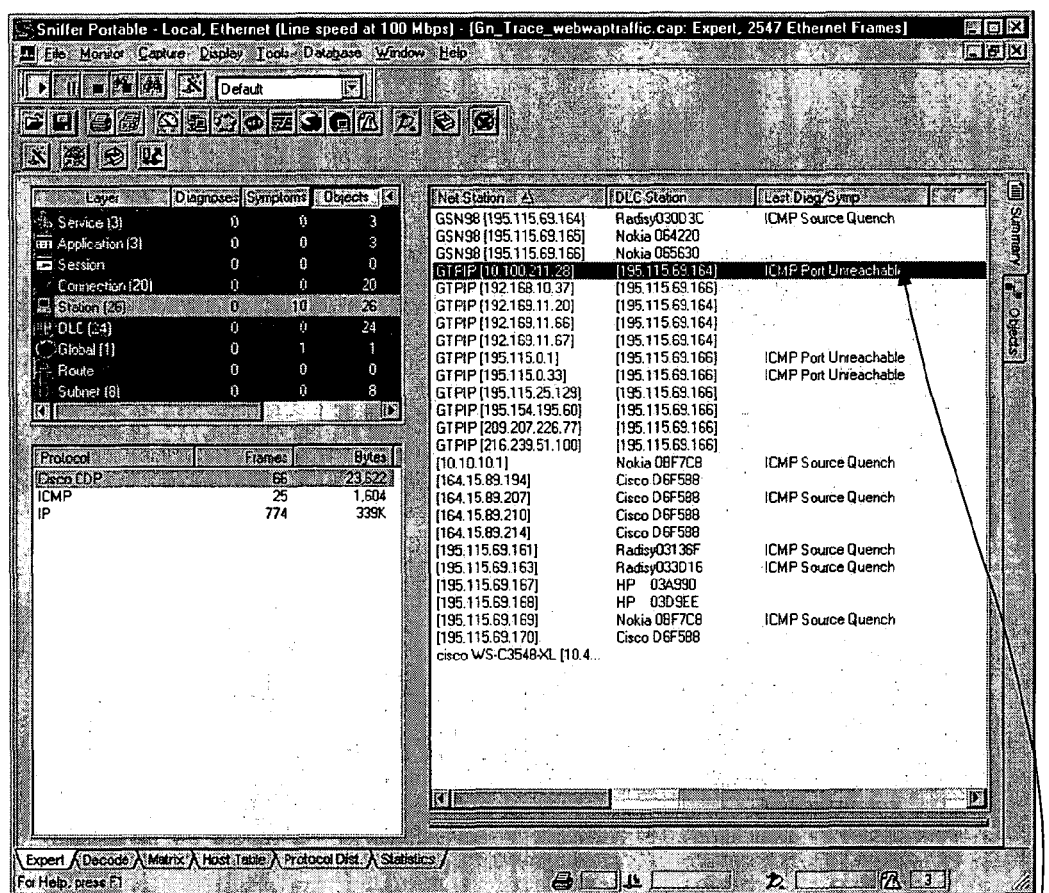
FIG. 25 illustrates an interface indicating how various alarms are diagnosed for IP conversations tunneled by GTP, in accordance with one embodiment.

FIG. 25 illustrates an interface 2500 indicating how various alarms are diagnosed for IP conversations tunneled by GTP, in accordance with one embodiment. As an option, the present graphical user interface 2500 may be implemented in the context of the system components, methods, and graphical user interfaces of the previous figures. Of course, the present graphical user interface 2500 may be implemented in any desired context.

Figure 26:
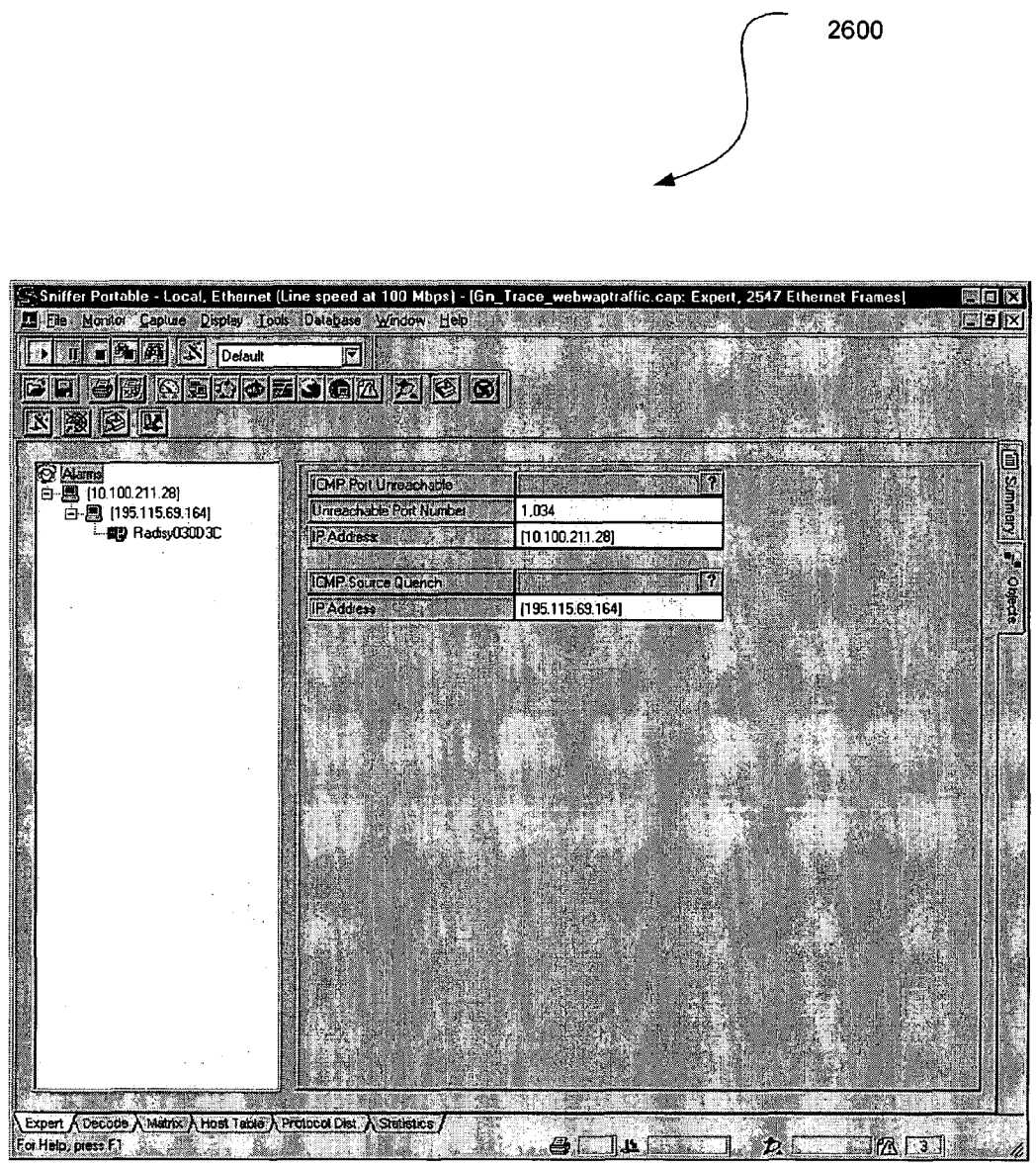
FIG. 26 illustrates the various alarms associated with the GSN IP conversation illustrated in the interface of FIG. 25.

As shown, an "ICMP Port Unreachable" alarm 2502 was detected for station 10.100.211.28, communicating through GSN 195.115.69.164. FIG. 26 illustrates the various alarms 2600 associated with the GSN IP conversation illustrated in the interface 2500 of FIG. 25.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method of capturing and selectively analyzing data frames transmitted between stations in a communications network utilizing tunneling protocols, comprising:
    establishing a connection with a communications network;
    receiving, in real-time, data frames transmitted in the communications network, wherein the data frames are communicated utilizing tunneling; and
    analyzing the data frames that are communicated utilizing the tunneling;
    wherein the analyzing is conditionally performed for one or more types of tunnels associated with the tunneling based on user input;
    wherein multiple objects generated by a plurality of protocol interpreters are linked to logically portray a relationship between endpoints of a tunnel and stations conversing inside the tunnel;
    wherein byte counts distinguish between the stations conversing inside the tunnel and the endpoints of the tunnel.

2. The method as recited in claim 1, wherein the tunneling involves the tunnel.

3. The method as recited in claim 2, wherein the tunnel includes an Internet Protocol (IP) tunnel.

4. The method as recited in claim 2, wherein the tunnel includes a General Packet Radio Service (GPRS) Tunnel Protocol (GTP) tunnel.

5. The method as recited in claim 2, wherein the tunnel includes a Generic Routing Encapsulation (GRE) tunnel.

6. The method as recited in claim 1, wherein the analyzing includes executing the plurality of protocol interpreters.

7. The method as recited in claim 6, wherein the plurality of protocol interpreters include an Internet Protocol (IP) protocol interpreter.

8. The method as recited in claim 7, wherein the IP protocol interpreter is re-executed to accommodate the tunneling.

9. The method as recited in claim 6, wherein the plurality of protocol interpreters generate at least one object.

10. A computer program product embodied on a computer readable medium, comprising:
   computer code for establishing a connection with a communications network;
   computer code for receiving, in real-time, data frames transmitted in the communications network, wherein the data frames are communicated utilizing tunneling; and
   computer code for analyzing the data frames that are communicated utilizing the tunneling;
   wherein the computer program product is operable such that the analyzing is conditionally performed for one or more types of tunnels associated with the tunneling based on user input;
   wherein the computer program product is operable such that multiple objects generated by a plurality of protocol interpreters are linked to logically portray a relationship between endpoints of a tunnel and stations conversing inside the tunnel;
   wherein the computer program product is operable such that byte counts distinguish between the stations conversing inside the tunnel and the endpoints of the tunnel.

11. The computer program product as recited in claim 10, wherein the tunneling involves the tunnel.

12. The computer program product as recited in claim 11, wherein the tunnel includes an Internet Protocol (IP) tunnel.

13. The computer program product as recited in claim 11, wherein the tunnel includes a General Packet Radio Service (GPRS) Tunnel Protocol (GTP) tunnel.

14. The computer program product as recited in claim 11, wherein the tunnel includes a Generic Routing Encapsulation (GRE) tunnel.

15. The computer program product as recited in claim 10, wherein the analyzing includes executing the plurality of protocol interpreters.

16. The computer program product as recited in claim 15, wherein the plurality of protocol interpreters include an Internet Protocol (IP) protocol interpreter.

17. The computer program product as recited in claim 16, wherein the IP protocol interpreter is re-executed to accommodate the tunneling.

18. The computer program product as recited in claim 15, wherein the plurality of protocol interpreters generate at least one object.

19. The computer program product as recited in claim 18, wherein statistics associated with the objects are displayed via a user interface.

20. A computer-implemented system, comprising:
   a microprocessor;
   a network analyzer coupled to a communications network for receiving, in real-time, data frames transmitted in the communications network,
   the data frames being communicated utilizing tunneling, wherein the system is operable such that the data frames that are communicated utilizing the tunneling are analyzed, the analysis conditionally performed for one or more types of tunnels associated with the tunneling based on user input,
   wherein the system is operable such that multiple objects generated by a plurality of protocol interpreters are linked to logically portray a relationship between endpoints of a tunnel and stations conversing inside the tunnel; wherein the system is operable such that byte counts distinguish between the stations conversing inside the tunnel and the endpoints of the tunnel.

21. The method as recited in claim 9, wherein statistics and diagnosed failure conditions associated with the at least one object are displayed via a user interface.

22. The method as recited in claim 9, wherein adverse conditions for the at least one object are diagnosed and presented in a detailed screen associated with the at least one object.

23. The method as recited in claim 8, wherein the IP protocol interpreter is re-executed in a recursive manner.

* * * * *